US008416266B2

(12) United States Patent
Shoemaker et al.

(10) Patent No.: US 8,416,266 B2
(45) Date of Patent: Apr. 9, 2013

(54) INTERACTING WITH DETAIL-IN-CONTEXT PRESENTATIONS

(75) Inventors: Garth B. D. Shoemaker, Vancouver (CA); Michael Doyle, Vancouver (CA); Richard Rupp, Burnaby (CA); Collette Ostler, West Vancouver (CA)

(73) Assignee: Noregin Assetts N.V., L.L.C., Dover, DE (US)

( * ) Notice: Subject to any disclaimer, the term of this patent is extended or adjusted under 35 U.S.C. 154(b) by 627 days.

(21) Appl. No.: 12/623,765

(22) Filed: Nov. 23, 2009
(Under 37 CFR 1.47)

(65) Prior Publication Data
US 2010/0262907 A1 Oct. 14, 2010

Related U.S. Application Data

(63) Continuation-in-part of application No. 11/249,493, filed on Oct. 14, 2005, now abandoned, and a continuation-in-part of application No. 11/673,038, filed on Feb. 9, 2007, now Pat. No. 7,966,570, which is a continuation of application No. 10/137,648, filed on May 3, 2002, now Pat. No. 7,197, 719.

(60) Provisional application No. 60/618,249, filed on Oct. 14, 2004.

(51) Int. Cl.
G09G 5/00 (2006.01)
(52) U.S. Cl. .......................... 345/663; 345/665; 345/471
(58) Field of Classification Search .................. None
See application file for complete search history.

(56) References Cited

U.S. PATENT DOCUMENTS

| 3,201,546 A | 8/1965 | Richardson |
| 3,704,938 A | 12/1972 | Fanselow |
| 3,739,739 A | 6/1973 | Brase |

(Continued)

FOREIGN PATENT DOCUMENTS

| CA | 2350342 | 11/2002 |
| CA | 2386560 | 11/2003 |

(Continued)

OTHER PUBLICATIONS

"Non Final Office Action", U.S. Appl. No. 12/368,267, (Jun. 11, 2010),12 pages.

(Continued)

*Primary Examiner* — Muhammad N Edun
(74) *Attorney, Agent, or Firm* — McAndrews, Held & Malloy, Ltd.

(57) ABSTRACT

A method for generating a presentation of a region-of-interest in an original image for display on a display surface, the method comprising: establishing a lens for the region-of-interest, the lens having a focal region with a magnification for the region-of-interest at least partially surrounded by a shoulder region across which the magnification varies to provide a continuous transition from the focal region to regions outside the lens; receiving a first signal for selecting the shoulder region; while receiving the first signal, receiving a second signal for selecting the focal region and for adjusting a position of the focal region relative to the shoulder region to define a degree and a direction of a folding of the focal region over the shoulder region for the lens; and, applying the lens to the original image to produce the presentation.

24 Claims, 9 Drawing Sheets

U.S. PATENT DOCUMENTS

| | | | |
|---|---|---|---|
| 3,762,799 A | 10/1973 | Shapiro | |
| 4,581,647 A | 4/1986 | Vye | |
| 4,630,110 A | 12/1986 | Cotton et al. | |
| 4,688,181 A | 8/1987 | Cottrell et al. | |
| 4,757,616 A | 7/1988 | Hills | |
| 4,790,028 A | 12/1988 | Ramage | |
| 4,800,379 A | 1/1989 | Yeomans | |
| 4,885,702 A | 12/1989 | Ohba | |
| 4,888,713 A | 12/1989 | Falk | |
| 4,970,028 A | 11/1990 | Kenyon et al. | |
| 4,985,849 A | 1/1991 | Hideaki | |
| 4,992,866 A | 2/1991 | Morgan | |
| 5,031,918 A | 7/1991 | Brill | |
| 5,048,077 A | 9/1991 | Wells et al. | |
| 5,175,808 A | 12/1992 | Sayre | |
| 5,185,599 A | 2/1993 | Dorrnink et al. | |
| 5,185,667 A | 2/1993 | Zimmermann | |
| 5,200,818 A | 4/1993 | Neta et al. | |
| 5,206,721 A | 4/1993 | Ashida et al. | |
| 5,227,771 A | 7/1993 | Kerr et al. | |
| 5,250,934 A | 10/1993 | Denber et al. | |
| 5,258,837 A | 11/1993 | Gormley | |
| 5,269,687 A | 12/1993 | Mott et al. | |
| 5,275,019 A | 1/1994 | Pagani | |
| 5,309,279 A | 5/1994 | Halstead | |
| 5,321,807 A | 6/1994 | Mumford | |
| 5,329,310 A | 7/1994 | Liljegren et al. | |
| 5,341,466 A | 8/1994 | Perlin et al. | |
| 5,369,527 A | 11/1994 | McCracken | |
| 5,416,900 A | 5/1995 | Blanchard et al. | |
| 5,432,895 A | 7/1995 | Myers | |
| 5,451,998 A | 9/1995 | Hamrick | |
| 5,459,488 A | 10/1995 | Geiser | |
| 5,473,740 A | 12/1995 | Kasson | |
| 5,521,634 A | 5/1996 | McGary | |
| 5,523,783 A | 6/1996 | Cho | |
| 5,528,289 A | 6/1996 | Cortjens et al. | |
| 5,539,534 A | 7/1996 | Hino et al. | |
| 5,581,670 A | 12/1996 | Bier et al. | |
| 5,583,977 A | 12/1996 | Seidl | |
| 5,588,098 A | 12/1996 | Chen et al. | |
| 5,594,859 A | 1/1997 | Palmer et al. | |
| 5,596,690 A | 1/1997 | Stone et al. | |
| 5,598,297 A | 1/1997 | Yamanaka et al. | |
| 5,610,653 A | 3/1997 | Abecassis | |
| 5,613,032 A | 3/1997 | Cruz et al. | |
| 5,638,523 A | 6/1997 | Mullet et al. | |
| 5,644,758 A | 7/1997 | Patrick | |
| 5,651,107 A | 7/1997 | Frank et al. | |
| 5,652,851 A | 7/1997 | Stone et al. | |
| 5,657,246 A | 8/1997 | Hogan et al. | |
| 5,670,984 A | 9/1997 | Robertson et al. | |
| 5,680,524 A | 10/1997 | Maples et al. | |
| 5,682,489 A | 10/1997 | Harrow et al. | |
| 5,689,287 A | 11/1997 | Mackinlay et al. | |
| 5,689,628 A | 11/1997 | Robertson | |
| 5,721,853 A | 2/1998 | Smith | |
| 5,729,673 A | 3/1998 | Cooper et al. | |
| 5,731,805 A | 3/1998 | Tognazzini et al. | |
| 5,742,272 A | 4/1998 | Kitamura et al. | |
| 5,745,166 A | 4/1998 | Rhodes et al. | |
| 5,751,289 A | 5/1998 | Myers | |
| 5,754,348 A | 5/1998 | Soohoo | |
| 5,764,139 A | 6/1998 | Nojima et al. | |
| 5,786,814 A | 7/1998 | Moran et al. | |
| 5,798,752 A | 8/1998 | Buxton et al. | |
| 5,808,670 A | 9/1998 | Oyashiki et al. | |
| 5,812,111 A | 9/1998 | Fuji et al. | |
| 5,818,455 A | 10/1998 | Stone et al. | |
| 5,848,231 A | 12/1998 | Teitelbaum et al. | |
| 5,852,440 A | 12/1998 | Grossman et al. | |
| 5,872,922 A | 2/1999 | Hogan et al. | |
| 5,909,219 A | 6/1999 | Dye | |
| 5,923,364 A | 7/1999 | Rhodes et al. | |
| 5,926,209 A | 7/1999 | Glatt | |
| 5,949,430 A | 9/1999 | Robertson et al. | |
| 5,950,216 A | 9/1999 | Amro et al. | |
| 5,959,605 A | 9/1999 | Gilblom | |
| 5,969,706 A | 10/1999 | Tanimoto et al. | |
| 5,973,694 A | 10/1999 | Steele et al. | |
| 5,991,877 A | 11/1999 | Luckenbaugh | |
| 5,999,879 A | 12/1999 | Yano | |
| 6,005,611 A | 12/1999 | Gullichsen et al. | |
| 6,037,939 A | 3/2000 | Kashiwagi et al. | |
| 6,052,110 A | 4/2000 | Sciammarella et al. | |
| 6,057,844 A | 5/2000 | Strauss | |
| 6,064,401 A | 5/2000 | Holzman et al. | |
| 6,067,372 A | 5/2000 | Gur et al. | |
| 6,072,501 A | 6/2000 | Bier | |
| 6,073,036 A | 6/2000 | Heikkinen et al. | |
| 6,075,531 A | 6/2000 | DeStefano | |
| 6,081,277 A | 6/2000 | Kojima | |
| 6,084,598 A | 7/2000 | Chekerylla | |
| 6,091,771 A | 7/2000 | Seeley et al. | |
| 6,108,005 A | 8/2000 | Starks et al. | |
| 6,128,024 A | 10/2000 | Carver et al. | |
| 6,133,914 A | 10/2000 | Rogers et al. | |
| 6,147,709 A | 11/2000 | Martin et al. | |
| 6,154,840 A | 11/2000 | Pebly et al. | |
| 6,160,553 A | 12/2000 | Robertson et al. | |
| 6,184,859 B1 | 2/2001 | Kojima | |
| 6,198,484 B1 | 3/2001 | Kameyama | |
| 6,201,546 B1 | 3/2001 | Bodor et al. | |
| 6,201,548 B1 | 3/2001 | Cariffe et al. | |
| 6,204,845 B1 | 3/2001 | Bates et al. | |
| 6,204,850 B1 | 3/2001 | Green | |
| 6,212,577 B1 * | 4/2001 | Stern et al. | 719/329 |
| 6,215,491 B1 | 4/2001 | Gould | |
| 6,219,052 B1 | 4/2001 | Gould | |
| 6,241,609 B1 | 6/2001 | Rutgers | |
| 6,246,411 B1 | 6/2001 | Strauss | |
| 6,249,281 B1 | 6/2001 | Chen et al. | |
| 6,256,043 B1 | 7/2001 | Aho et al. | |
| 6,256,115 B1 | 7/2001 | Adler et al. | |
| 6,256,737 B1 | 7/2001 | Bianco et al. | |
| 6,266,082 B1 | 7/2001 | Yonezawa et al. | |
| 6,271,854 B1 | 8/2001 | Light | |
| 6,278,443 B1 | 8/2001 | Amro et al. | |
| 6,278,450 B1 | 8/2001 | Arcuri et al. | |
| 6,288,702 B1 | 9/2001 | Tachibana et al. | |
| 6,304,271 B1 | 10/2001 | Nehme | |
| 6,307,612 B1 | 10/2001 | Smith et al. | |
| 6,320,599 B1 | 11/2001 | Sciammarella et al. | |
| 6,337,709 B1 | 1/2002 | Yamaashi et al. | |
| 6,346,938 B1 | 2/2002 | Chan et al. | |
| 6,346,962 B1 | 2/2002 | Goodridge | |
| 6,359,615 B1 | 3/2002 | Singh | |
| 6,381,583 B1 | 4/2002 | Kenney | |
| 6,384,849 B1 | 5/2002 | Morcos et al. | |
| 6,392,661 B1 | 5/2002 | Tankersley | |
| 6,396,648 B1 | 5/2002 | Yamamoto et al. | |
| 6,396,962 B1 | 5/2002 | Haffey et al. | |
| 6,400,848 B1 | 6/2002 | Gallagher | |
| 6,407,747 B1 | 6/2002 | Chui et al. | |
| 6,411,274 B2 | 6/2002 | Watanabe et al. | |
| 6,416,186 B1 | 7/2002 | Nakamura | |
| 6,417,867 B1 | 7/2002 | Hallberg | |
| 6,438,576 B1 | 8/2002 | Huang et al. | |
| 6,487,497 B2 | 11/2002 | Khavakh et al. | |
| 6,491,585 B1 | 12/2002 | Miyamoto et al. | |
| 6,504,535 B1 | 1/2003 | Edmark | |
| 6,515,663 B1 | 2/2003 | Hung et al. | |
| 6,515,678 B1 | 2/2003 | Boger | |
| 6,522,341 B1 | 2/2003 | Nagata | |
| 6,523,024 B1 | 2/2003 | Yajima et al. | |
| 6,542,191 B1 | 4/2003 | Yonezawa | |
| 6,552,737 B1 | 4/2003 | Tanaka et al. | |
| 6,559,813 B1 | 5/2003 | DeLuca et al. | |
| 6,577,311 B1 | 6/2003 | Crosby et al. | |
| 6,577,319 B1 | 6/2003 | Kashiwagi et al. | |
| 6,584,237 B1 | 6/2003 | Abe | |
| 6,590,568 B1 | 7/2003 | Astala et al. | |
| 6,590,583 B2 | 7/2003 | Soohoo | |
| 6,608,631 B1 | 8/2003 | Milliron | |
| 6,612,930 B2 | 9/2003 | Kawagoe et al. | |
| 6,631,205 B1 | 10/2003 | Melen et al. | |
| 6,633,305 B1 | 10/2003 | Sarfield | |

| | | |
|---|---|---|
| 6,690,387 B2 | 2/2004 | Zimmerman et al. |
| 6,704,034 B1 | 3/2004 | Rodriguez et al. |
| 6,720,971 B1 | 4/2004 | Yamamoto et al. |
| 6,721,655 B1 | 4/2004 | Utsumi |
| 6,727,910 B2 | 4/2004 | Tigges |
| 6,731,285 B2 | 5/2004 | Matchen |
| 6,731,315 B1 | 5/2004 | Ma et al. |
| 6,744,430 B1 | 6/2004 | Shimizu |
| 6,747,610 B1 | 6/2004 | Taima et al. |
| 6,747,611 B1 | 6/2004 | Budd et al. |
| 6,760,020 B1 | 7/2004 | Uchiyama et al. |
| 6,768,497 B2 | 7/2004 | Baar et al. |
| 6,798,412 B2 | 9/2004 | Cowperthwaite |
| 6,833,843 B2 | 12/2004 | Mojaver et al. |
| 6,842,175 B1 | 1/2005 | Schmalstieg et al. |
| 6,874,126 B1 | 3/2005 | Lapidous |
| 6,882,755 B2 | 4/2005 | Silverstein et al. |
| 6,906,643 B2 | 6/2005 | Samadani et al. |
| 6,911,975 B2 | 6/2005 | Iizuka et al. |
| 6,919,921 B1 | 7/2005 | Morota et al. |
| 6,924,822 B2 | 8/2005 | Card et al. |
| 6,938,218 B1 | 8/2005 | Rosen |
| 6,956,590 B1 | 10/2005 | Barton et al. |
| 6,961,071 B2 | 11/2005 | Montagnese et al. |
| 6,975,335 B2 * | 12/2005 | Watanabe ............ 345/660 |
| 6,985,865 B1 | 1/2006 | Packingham et al. |
| 7,038,680 B2 | 5/2006 | Pitkow |
| 7,055,095 B1 | 5/2006 | Anwar |
| 7,071,971 B2 | 7/2006 | Elberbaum |
| 7,084,886 B2 | 8/2006 | Jetha et al. |
| 7,088,364 B2 | 8/2006 | Lantin |
| 7,106,349 B2 | 9/2006 | Baar et al. |
| 7,133,054 B2 * | 11/2006 | Aguera y Arcas ...... 345/666 |
| 7,134,092 B2 | 11/2006 | Fung et al. |
| 7,158,878 B2 | 1/2007 | Rasmussen et al. |
| 7,173,633 B2 | 2/2007 | Tigges |
| 7,173,636 B2 | 2/2007 | Montagnese |
| 7,194,697 B2 | 3/2007 | Sinclair, II et al. |
| 7,197,718 B1 | 3/2007 | Westerman et al. |
| 7,197,719 B2 | 3/2007 | Doyle et al. |
| 7,213,214 B2 | 5/2007 | Baar et al |
| 7,233,942 B2 | 6/2007 | Nye |
| 7,246,109 B1 | 7/2007 | Ramaswamy |
| 7,256,801 B2 | 8/2007 | Baar et al. |
| 7,274,381 B2 | 9/2007 | Mojaver et al. |
| 7,275,219 B2 | 9/2007 | Shoemaker |
| 7,280,105 B2 | 10/2007 | Cowperthwaite |
| 7,283,141 B2 | 10/2007 | Baar et al. |
| 7,310,619 B2 | 12/2007 | Baar et al. |
| 7,312,806 B2 | 12/2007 | Tigges |
| 7,321,824 B1 | 1/2008 | Nesbitt |
| 7,411,610 B2 | 8/2008 | Doyle |
| 7,423,660 B2 | 9/2008 | Ouchi et al. |
| 7,443,396 B2 | 10/2008 | Ilic |
| 7,450,114 B2 | 11/2008 | Anwar |
| 7,472,354 B2 | 12/2008 | Jetha et al. |
| 7,486,302 B2 | 2/2009 | Shoemaker |
| 7,489,321 B2 | 2/2009 | Jetha et al. |
| 7,493,572 B2 | 2/2009 | Card et al. |
| 7,495,678 B2 | 2/2009 | Doyle et al. |
| 7,580,036 B2 | 8/2009 | Montagnese |
| 7,667,699 B2 | 2/2010 | Komar |
| 7,698,653 B2 | 4/2010 | Roman et al. |
| 7,714,859 B2 | 5/2010 | Shoemaker et al. |
| 7,737,976 B2 | 6/2010 | Lantin |
| 7,761,713 B2 | 7/2010 | Baar |
| 7,773,101 B2 | 8/2010 | Shoemaker |
| 2001/0040585 A1 | 11/2001 | Hartford et al. |
| 2001/0040636 A1 | 11/2001 | Kato et al. |
| 2001/0048447 A1 | 12/2001 | Jogo |
| 2001/0055030 A1 | 12/2001 | Han |
| 2002/0033837 A1 | 3/2002 | Munro |
| 2002/0038257 A1 | 3/2002 | Joseph et al. |
| 2002/0044154 A1 | 4/2002 | Baar et al. |
| 2002/0062245 A1 | 5/2002 | Niu et al. |
| 2002/0075280 A1 | 6/2002 | Tigges |
| 2002/0087894 A1 | 7/2002 | Foley et al. |
| 2002/0089520 A1 | 7/2002 | Baar |
| 2002/0093567 A1 | 7/2002 | Cromer et al. |
| 2002/0101396 A1 | 8/2002 | Huston et al. |
| 2002/0122038 A1 | 9/2002 | Cowperthwaite |
| 2002/0135601 A1 | 9/2002 | Watanabe et al. |
| 2002/0143826 A1 | 10/2002 | Day et al. |
| 2002/0171644 A1 | 11/2002 | Reshetov et al. |
| 2002/0180801 A1 | 12/2002 | Doyle et al. |
| 2003/0006995 A1 | 1/2003 | Smith et al. |
| 2003/0007006 A1 | 1/2003 | Baar et al. |
| 2003/0048447 A1 | 3/2003 | Harju et al. |
| 2003/0052896 A1 | 3/2003 | Higgins et al. |
| 2003/0052900 A1 | 3/2003 | Card et al. |
| 2003/0061211 A1 | 3/2003 | Shultz et al. |
| 2003/0076363 A1 | 4/2003 | Murphy |
| 2003/0100326 A1 | 5/2003 | Grube et al. |
| 2003/0103063 A1 | 6/2003 | Mojaver et al. |
| 2003/0105795 A1 | 6/2003 | Anderson et al. |
| 2003/0112503 A1 | 6/2003 | Lantin |
| 2003/0118223 A1 | 6/2003 | Rahn et al. |
| 2003/0137525 A1 | 7/2003 | Smith |
| 2003/0151625 A1 | 8/2003 | Shoemaker |
| 2003/0151626 A1 | 8/2003 | Komar et al. |
| 2003/0174146 A1 | 9/2003 | Kenoyer |
| 2003/0179198 A1 | 9/2003 | Uchiyama |
| 2003/0179219 A1 | 9/2003 | Nakano et al. |
| 2003/0179237 A1 * | 9/2003 | Nelson et al. ........... 345/765 |
| 2003/0196114 A1 | 10/2003 | Brew et al. |
| 2003/0210281 A1 | 11/2003 | Ellis et al. |
| 2003/0227556 A1 | 12/2003 | Doyle |
| 2003/0231177 A1 | 12/2003 | Montagnese et al. |
| 2004/0026521 A1 | 2/2004 | Colas et al. |
| 2004/0056869 A1 | 3/2004 | Jetha et al. |
| 2004/0056898 A1 | 3/2004 | Jetha et al. |
| 2004/0111332 A1 | 6/2004 | Baar et al. |
| 2004/0125138 A1 | 7/2004 | Jetha et al. |
| 2004/0150664 A1 | 8/2004 | Baudisch |
| 2004/0194014 A1 | 9/2004 | Anwar |
| 2004/0217979 A1 | 11/2004 | Baar et al. |
| 2004/0240709 A1 | 12/2004 | Shoemaker |
| 2004/0257375 A1 | 12/2004 | Cowperthwaite |
| 2004/0257380 A1 | 12/2004 | Herbert et al. |
| 2005/0041046 A1 | 2/2005 | Baar et al. |
| 2005/0134610 A1 | 6/2005 | Doyle et al. |
| 2005/0259118 A1 | 11/2005 | Mojaver et al. |
| 2005/0278378 A1 | 12/2005 | Frank |
| 2005/0285861 A1 | 12/2005 | Fraser |
| 2006/0022955 A1 | 2/2006 | Kennedy |
| 2006/0026521 A1 | 2/2006 | Hotelling et al. |
| 2006/0033762 A1 | 2/2006 | Card et al. |
| 2006/0036629 A1 | 2/2006 | Gray |
| 2006/0059432 A1 | 3/2006 | Bells |
| 2006/0082901 A1 | 4/2006 | Shoemaker |
| 2006/0098028 A1 | 5/2006 | Baar |
| 2006/0139375 A1 | 6/2006 | Rasmussen et al. |
| 2006/0192780 A1 | 8/2006 | Lantin |
| 2006/0214951 A1 | 9/2006 | Baar et al. |
| 2007/0033543 A1 | 2/2007 | Ngari et al. |
| 2007/0064018 A1 | 3/2007 | Shoemaker et al. |
| 2007/0097109 A1 | 5/2007 | Shoemaker et al. |
| 2009/0141044 A1 | 6/2009 | Shoemaker |
| 2009/0147023 A1 | 6/2009 | Jetha et al. |
| 2009/0172587 A1 | 7/2009 | Carlisle |
| 2009/0265656 A1 | 10/2009 | Jetha |
| 2009/0284542 A1 | 11/2009 | Baar |
| 2010/0026718 A1 | 2/2010 | Jetha |
| 2010/0033503 A1 | 2/2010 | Baar |
| 2010/0045702 A1 | 2/2010 | Doyle |
| 2010/0201785 A1 | 8/2010 | Lantin |
| 2010/0208968 A1 | 8/2010 | Shoemaker et al. |

FOREIGN PATENT DOCUMENTS

| | | |
|---|---|---|
| CA | 2393708 | 1/2004 |
| CA | 2394119 | 1/2004 |
| EP | 0635779 | 1/1995 |
| EP | 0650144 | 4/1995 |
| EP | 0816983 | 7/1998 |
| JP | 4410465 | 2/2010 |

OTHER PUBLICATIONS

"Notice of Allowability", U.S. Appl. No. 12/364,450, (Jun. 18, 2010), 2 pages.

"Non Final Office Action", U.S. Appl. No. 12/388,437, (Jun. 23, 2010), 7 pages.

"Non Final Office Action", U.S. Appl. No. 12/764,724, (Jul. 1, 2010), 20 pages.

"Non Final Office Action", U.S. Appl. No. 11/673,038, (Jul. 22, 2010), 39 pages.

"Final Office Action", U.S. Appl. No. 11/691,686, (Sep. 1, 2010), 16 pages.

"Non Final Office Action", U.S. Appl. No. 11/138,979, (Sep. 17, 2010), 11 pages.

"Non Final Office Action", U.S. Appl. No. 11/541,778, (Sep. 29, 2010), 10 pages.

"Non Final Office Action", U.S. Appl. No. 11/695,104, (Oct. 1, 2010) ,9 pages.

"Final Office Action", U.S. Appl. No. 11/159,205, (Oct. 6, 2010), 16 pages.

"Non Final Office Action", U.S. Appl. No. 11/236,694, (Oct. 13, 2010), 16 pages.

Lieberman, Henry "Power of Ten Thousand—Navigating in Large Information Spaces", *Proceedings of the 7th annual ACM symposium on User interface software and technology*, Marina del Rey, California, United States, (Nov. 1994), pp. 15-16.

Mills, Michael et al., "A Magnifier Tool for Video Data", *Proceedings of the SIGCHI conference on Human factors in computing systems*. (1992),pp. 93-96.

Kline, Richard L., et al., "Improving GUI Accessibility for People with Low Vision", *Proceedings of the SIGCHI conference on Human factors in computing systems*, (1995), pp. 114-121.

Perlin, Ken et al., "Pad—an alternative approach to the computer interface", *International Conference on Computer Graphics and Interactive Techniques. Proceedings of the 20th annual conference on Computer graphics and interactive techniques.*, (1993), pp. 57-64.

Bier, Eric A., et al., "The Movable Filter as a User Interface Tool—The Video", *Conference on Human Factors in Computing Systems Conference companion on Human factors in computing systems*, (1995), pp. 413-414.

Bier, Eric A., et al., "Toolglass and Magic Lenses—The See-Through Interface", *International Conference on Computer Graphics and Interactive Techniques Proceedings of the 20th annual conference on Computer graphics and interactive techniques*, (1993), pp. 73-80.

Bier, Eric A., et al., "Toolglass and Magic Lenses—The See-Through Interface", *Conference on Human Factors in Computing Systems Conference companion on Human factors in computing systems*, (1994), pp. 445-446.

Kamba, Tomonari et al., "Using Small Screen Space More Efficiently", *CHI 96 Vancouver, BC Canada*, (1996), pp. 383-390.

"Final Office Action", U.S. Appl. No. 12/368,263, (Nov. 5, 2010), 7 pages.

"Final Office Action", U.S. Appl. No. 12/764,724, (Nov. 9, 2010), 21 pages.

"Non Final Office Action", U.S. Appl. No. 11/691,686, (Mar. 18, 2010), 17 pages.

"Advisory Action", U.S. Appl. No. 11/673,038, (Mar. 25, 2010), 3 pages.

"Final Office Action", U.S. Appl. No. 11/159,205, (Mar. 25, 2010), 16 pages.

"Notice of Allowance", U.S. Appl. No. 12/364,450, (Apr. 19, 2010), 4 pages.

"Non-Final Office Action", U.S. Appl. No. 11/236,694, (Apr. 20, 2010), 9 pages.

"Non Final Office Action", U.S. Appl. No. 12/368,263, (Apr. 30, 2010), 8 pages.

"Final Office Action", U.S. Appl. No. 11/691,686, (Nov. 22, 2010), 16 pages.

"Non Final Office Action", U.S. Appl. No. 11/935,222, (Feb. 20, 2009),8 pages.

Carpendale, M. Sheelagh T., et al., "A Framework for Unifying Presentation Space", *Proceedings of UIST '01: ACM Symposium on User Interface Software and Technology*, Orlando, FL, USA, XP002249323 2001, New York, NY, USA, ISBN: 1-58113-438-X,(Nov. 14, 2001),pp. 61-70, 64.

Ikedo, Tsuneo "A Realtime Video-Image Mapping Using Polygon Rendering Techniques", IEEE Intl. conf on Ottawa, ONT, Canada Jun. 3-6, 1997, Los Alamitos, CA, USA; *IEEE Comput. Soc*, US, XP010239181, ISBN: 0-8186-7819-4 Sections 2, 4.4; Multimedia Computing and Systems '97 Proceedings,(Jun. 3, 1997),pp. 127-134.

Bouju, Alain et al., "Client-Server Architecture for Accessing Multimedia and Geographic Databases within Embedded Systems", Database and Expert Systems Applications, 1999 Proceedings. Tenth International Workshop on Florence, Italy Sep. 1-3, 1999, Los Alamitos, CA, USA, *IEEE Comput. Soc*, US, XP010352370; ISBN:0-7695-0281-4, abstract, figure 2,(Sep. 1-3, 1999), pp. 760-764.

Robertson George G., et al., "The Document Lens", *UIST. Proceedings of the Annual ACM Symposium on User Interface Software and Technology*, abstract figures 3,4,(Nov. 3, 1993),pp. 101-108.

Dursteler, Juan C., "The Digital Magazine of InfoVis.net", Retrieved from: <http://www.infovis.net/printMag.php?nu,=85&lang=2> on Nov. 9, 2006, (Apr. 22, 2002),2 pages.

"Presentation for CGDI Workshops", Retrieved from: http://www.geoconnections.org/developersCorner/devCorner__devNetwork/meetings/2002.05.30/IDELIX_CGDI_20020530_dist.pdf, (May 2002),19 pages.

Kuederle, Oliver "Presentation of Image Sequences: A Detail-in-context Approach", *Thesis, Simon Fraser University*; (Aug. 2000),pp. 1-3, 5-10, 29-31.

Microsoft Corp., "Microsoft Paint", (1981-1998),pp. 1-14.

"Electronic Magnifying Glasses", *IBM Technical Disclosure Bulletin, IBM Corp.*, New York, US, vol. 37, No. 3; XP000441501, ISSN: 0018-8689 the whole document; (Mar. 1, 1994),pp. 353-354.

Keahey, T. A., "The Generalized Detail-In-Context Problem", Information Visulization 1998, Proceedings; IEEE Symposium On Research Triangle, CA, USA; Los Alamitos, CA, USA, *IEEE Comput. Soc*, US; XP010313304; ISBN: 0-8186-9093,(Oct. 1998),pp. 44-51, 152.

Carpendale, M. Sheelagh T., et al., "3-Dimensional Pliable Surfaces: For the Effective Presentation of Visual Information", *Proceedings of the 8th annual ACM symposium on User interface and software technology*; (Nov. 14-17, 1995),pp. 217-226.

Carpendale, M. Sheelagh T., et al., "Extending Distortion Viewing from 2D to 3D", *IEEE Computer Graphics and Applications, IEEE Inc.* New York, US, vol. 17, No. 4; XP000927815, ISSN: 0272-1716. (Jul. 1997),pp. 42-51.

Viega, J et al., "3D magic lenses", *Proceedings of the 9th annual ACM symposium on User interface software and technology*; Pub 1996 ACM Press New York, NY, USA; (1996),51-58.

Cowperthwaite, David J., "Occlusion Resolution Operators for Three-Dimensional Detail-In-Context", Burnaby, British Columbia: *Simon Fraser University*; (2000), 166 pages.

Carpendale, M. Sheelagh T., et al., "Exploring Distinct Aspects of the Distortion Viewing Paradigm", *Technical Report TR 97-08, School of Computer Science*, Simon Fraser University, Burnaby, British Columbia, Canada; (Sep. 1997),14 pages.

Cowperthwaite, David J., et al., "Visual Access For 3D Data", *Proceedings of ACM CHI 96 Conference on Human Factors in Computer Systems, vol. 2 of Short Papers: Alternative Methods of Interaction*; (1996),5 pages.

Keahey, T. A., "Visualization of High-Dimensional Clusters Using Nonlinear Magnification", *Technical Report LA-UR-98-2776, Los Alamos National Laboratory*; (1998),8 pages.

Tigges, M. et al., "Generalized Distance Metrics for Implicit Surface Modeling", *Proceedings of the Tenth Western Computer Graphics Symposium*; (Mar. 1999),5 pages.

Bossen, Frank "Anisotropic Mesh Generation With Particles", *Technical Report CMU-CS-96-134, CS Dept, Carnegie Mellon University*; (May 13, 1996),pp. 1-59.

Bossen, Frank J., et al., "A Pliant Method for Anisotropic Mesh Generation", *5th Intl. Meshing Roundtable*; (Oct. 1996),pp. 63-74.

Wilson, et al., "Direct Volume Rendering Via 3D Textures", *Technical Report UCSC-CRL-94-19*, University of California, Santa Cruz, Jack Baskin School of Engineering; (Jun. 1994),11 pages.

Carpendale, M. Sheelagh T., "A Framework for Elastic Presentation Space", *PhD thesis*, Simon Fraser University; Available at <http://pages.cpsc.ucalgary.ca/~sheelagh/wiki/uploads/Main/Thesis/pre.pdf>,(Mar. 1999), pp. 69, 72, 78-83,98-100, 240, 241.

Leung, Y. K., et al., "A Review and taxonomy of distortion-oriented presentation techniques", *ACM Transactions on Computer-Human Interaction*, (1994),pp. 126-160.

Keahey, T. A., et al., "Techniques for Non-Linear Magnification Transformations", Information Visualization '96, Proceedings IEEE Symposium on, San Francisco, CA, Los Alamitos, CA, USA, *IEEE Comput. Soc*, US: XP010201943; ISBN: 0-8186-7668-X the whole document,(Oct. 28, 1996),pp. 38-45.

Tominski, Christian et al., "Fisheye Tree Views and Lenses for Graph Visualization", pp. 1-8.

Keahey, T. A., "Getting Along: Composition of Visualization Paradigms", *Visual Insights, Inc.*; (2001),4 pages.

Sakamoto, Chikara et al., "Design and Implementation of a Parallel Pthread Library (PPL) with Parallelism and Portability", *Systems and Computers in Japan*, New York, US, vol. 29, No. 2; XP000752780, ISSN: 0882-1666 abstract,(Feb. 1, 1998),pp. 28-35.

Deng, Ke et al., "Texture Mapping with a Jacobian-Based Spatially-Variant Filter", *Proceedings 10th Pacific Conference on Computer Graphics and Applications*, XP00224932, ISBN; 0-7695-1784-6 the whole document,(Oct. 2002),pp. 460-461.

Welsh, Michelle "Futurewave Software", *Business Wire*; (Nov. 15, 1993),2 Pages.

Lamar, Eric et al., "A Magnification Lens for Interactive Volume Visualization", *ACM*; (Oct. 2001),pp. 1-10.

Fitzmaurice, George et al., "Tracking Menus", *UIST*; (2003),pp. 71-79.

Stone, et al., "The movable filter as a user interface tool", *Proceedings of CHI ACM*; (1992),18 pages.

Baudisch, P. et al., "Halo: a Technique For Visualizng Off-Screen Locations", *CHI*; Retrieved from: <www.patrickbaudisch.com/.../2003-Baudisch-CHI03-Halo.pdf<, (May 5-10, 2003),8 pages.

Baudisch, Patrick et al., "Drag-And-Pop: Techniques For Accessing Remote Screen Content On Touch-And-Pen-Operated Systems", *Interact '03*, (2003),pp. 57-64.

Carpendale, M. Sheelagh T., et al., "Making Distortions Comprehensible", Visual Languages, Proceedings, 1997 IEEE Symposium On Isle of Capri, Italy, Los Alamitos, CA, USA, *IEEE Comput. Soc.*, US, Sep. 23, 1997; XP010250566, ISBN: 0-8186-8144-6,(Sep. 23-26, 1997),pp. 36-45.

Ito, Minoru et al., "A Three-Level Checkerboard Pattern (TCP) Projection Method for Curved Surface Measurement", *Pattern Recognition*, vol. 28, No. 1, XP004014030, ISSN 0031-3203,(1995),pp. 27-40.

Keahey, T. A., et al., "Nonlinear Magnification Fields", Information Visualization, 1997, Proceedings, IEEE Symposium On Phoenix, AZ, USA, Los Alamitos, CA, USA, *IEEE Comput. Soc.*, US; XP010257169; ISBN: 0-8186-8189-6,(Oct. 1997),pp. 51-58 and 121.

Rauschenbach, Uwe "The Rectangular Fish Eye View as an Efficient Method for the Transmission and Display of Large Images", Image Processing, ICIP 99, Proceedings, 1999 International Conference On, Kobe, Japan, Oct. 24-28, 1999, Piscataway, NJ, USA, *IEEE*, US, XP010368852, ISBN 0-7803-5467-2 p. 115, left-hand col.-p. 116, paragraph 3, p. 118, paragraph 7.1; (Oct. 1999),pp. 115-119.

Keahey T. A., "Nonlinear Magnification" (*Indiana University Computer Science*), (1997), 196 pages.

Watt, et al., "Advanced Animation and Rendering Techniques", (*Addison-Wesley Publishing*), (1992), p. 106-108.

Boots, Barry N., "Delaunay Triangles: An Alternative Approach to Point Pattern Analysis", *Proceedings of the Association of American Geographers*, vol. 6, (1974),pp. 26-29.

Carpendale, M. Sheelagh T., et al., "Distortion Viewing Techniques for 3-Dimensional Data", Information Visualization '96, Proceedings IEEE Symposium On CA, USA, Los Alamitos, CA, USA, *IEEE Comput. Soc*, US Oct. 28, 1996; XP010201944; ISBN: 0-8186-7668-X,(Oct. 1996),8 pages.

"Non Final Office Action", U.S. Appl. No. 10/358,394, (Mar. 13, 2009),36 pages.

Sarkar, Manojit et al., "Stretching the Rubber Sheet: A Metaphor for Viewing Large Layouts on Small Screens", *Proc. of the 6th Annual ACM Symosium. on User interface Software and Technology*, Atlanta, GA, (Nov. 1993),pp. 81-91.

Carpendale, M. Sheelagh T., et al., "Graph Folding: Extending Detail and Context Viewing into a Tool for Subgraph Comparisons", *In Proceedings of Graph Drawing 1995*, Passau, Germany, (1995),13 pages.

Carpendale, M. Sheelagh T., "A Framework for Elastic Presentation Space", Available at <http://pages.cpsc.ucalgary.ca/~sheelagh/personal/thesis/>,(Nov. 19, 1999),1 page.

"Non Final Office Action", U.S. Appl. No. 11/542,120, (Jan. 22, 2009),12 pages.

"Final Office Action", U.S. Appl. No. 11/410,024, (Mar. 11, 2009),20 pages.

"Foreign Office Action", Application Serial No. 2002-536993, (Mar. 11, 2009),2 pages.

"Notice of Allowance & Examiners Amendment", U.S. Appl. No. 11/401,349, (Apr. 17, 2009),10 pages.

Schmalstieg, Dieter et al., "Using Transparent Props for Interaction with the Virtual Table", *Proceedings of the 1999 symposium on Interactive 3D graphics.*, (Apr. 26, 1999),8 pages.

"Final Office Action", U.S. Appl. No. 10/705,199, (May 12, 2009),13 pages.

"Non Final Office Action", U.S. Appl. No. 11/541,778, (Jun. 19, 2009),11 pages.

"Non Final Office Action", U.S. Appl. No. 11/673,038, (Jul. 13, 2009),30 pages.

"Non Final Office Action", U.S. Appl. No. 11/410,024, (Jul. 20, 2009),12 pages.

Smith, et al., "Efficient techniques for wide-angle stereo vision using surface projection models", Retrieved from <http://ieee.org/stamp.jsp?arnumber=17045, (1999),6 pages.

"Non Final Office Action", U.S. Appl. No. 11/159,205, (Jul. 27, 2009),13 pages.

"Advisory Action", U.S. Appl. No. 11/249,493, (Aug. 11, 2009),5 pages.

"Advisory Action", U.S. Appl. No. 10/705,199, (Aug. 18, 2009),3 pages.

"Restriction Requirement", U.S. Appl. No. 11/935,222, (Aug. 20, 2009),6 pages.

"Advisory Action", U.S. Appl. No. 11/249,493, (Sep. 14, 2009),4 pages.

"Non-Final Office Action", U.S. Appl. No. 12/364,450, (Sep. 30, 2009),10 pages.

"Notice of Allowance", U.S. Appl. No. 10/358,394, (Oct. 8, 2009),7 pages.

"Final Office Action", U.S. Appl. No. 11/935,222, (Nov. 24, 2009),8 pages.

"Final Office Action", U.S. Appl. No. 11/541,778, (Dec. 4, 2009),12 pages.

"Notice of Allowance", U.S. Appl. No. 11/214,886, (Dec. 15, 2009),16 pages.

"BPAI Decision", U.S. Appl. No. 10/682,298, (Dec. 30, 2009),14 pages.

"Notice of Allowance", U.S. Appl. No. 11/410,024, (Jan. 4, 2010),7 pages.

"Final Office Action", U.S. Appl. No. 11/673,038, (Jan. 8, 2010),33 pages.

"Advisory Action", U.S. Appl. No. 11/541,778, (Feb. 1, 2010),3 pages.

"Advisory Action", U.S. Appl. No. 11/935,222, (Feb. 4, 2010),3 pages.

"Restriction Requirement", U.S. Appl. No. 12/368,263, (Mar. 9, 2010),7 pages.

"Notice of Allowance", U.S. Appl. No. 10/705,199, (Mar. 10, 2010),18 pages.

* cited by examiner

INTERACTING WITH DETAIL-IN-CONTEXT PRESENTATIONS

RELATED APPLICATIONS

This application claims priority as a continuation-in-part from U.S. patent application Ser. No. 11/249,493, filed Oct. 14, 2005 (pending), which claims priority to U.S. Provisional Patent Application No. 60/618,249, filed Oct. 14, 2004; and U.S. patent application Ser. No. 11/673,038, filed Feb. 9, 2007, which is a continuation of U.S. application Ser. No. 10/137,648, filed May 3, 2002 (now U.S. Pat. No. 7,197,719), which claims priority to Canadian Applications 2,350,342, field Jun. 12, 2001 and 2,345,803, filed May 3, 2001, the entire disclosures of each of these applications are hereby incorporated by reference.

BACKGROUND

Modern computer graphics systems, including virtual environment systems, are used for numerous applications such as mapping, navigation, flight training, surveillance, and even playing computer games. In general, these applications are launched by the computer graphics system's operating system upon selection by a user from a menu or other graphical user interface ("GUI"). A GUI is used to convey information to and receive commands from users and generally includes a variety of GUI objects or controls, including icons, toolbars, drop-down menus, text, dialog boxes, buttons, and the like. A user typically interacts with a GUI by using a pointing device (e.g., a mouse) to position a pointer or cursor over an object and "clicking" on the object.

One problem with these computer graphics systems is their inability to effectively display detailed information for selected graphic objects when those objects are in the context of a larger image. A user may require access to detailed information with respect to an object in order to closely examine the object, to interact with the object, or to interface with an external application or network through the object. For example, the detailed information may be a close-up view of the object or a region of a digital map image.

While an application may provide a GUI for a user to access and view detailed information for a selected object in a larger image, in doing so, the relative location of the object in the larger image may be lost to the user. Thus, while the user may have gained access to the detailed information required to interact with the object, the user may lose sight of the context within which that object is positioned in the larger image. This is especially so when the user must interact with the GUI using a computer mouse or keyboard. The interaction may further distract the user from the context in which the detailed information is to be understood. This problem is an example of what is often referred to as the "screen real estate problem".

SUMMARY

According to one aspect, there is provided a method for generating a presentation of a region-of-interest in an original image for display on a display surface, the method comprising: establishing a lens for the region-of-interest, the lens having a focal region with a magnification for the region-of-interest at least partially surrounded by a shoulder region across which the magnification varies to provide a continuous transition from the focal region to regions outside the lens; receiving a first signal for selecting the shoulder region; while receiving the first signal, receiving a second signal for selecting the focal region and for adjusting a position of the focal region relative to the shoulder region to define a degree and a direction of a folding of the focal region over the shoulder region for the lens; and, applying the lens to the original image to produce the presentation.

According to another aspect, there is provided a method for generating a presentation of a region-of-interest in an original image for display on a display surface, the method comprising: establishing a lens for the region-of-interest, the lens having a focal region with a magnification for the region-of-interest at least partially surrounded by a shoulder region across which the magnification varies to provide a continuous transition from the focal region to regions outside the lens; receiving a first signal for selecting a first point in the focal region; while receiving the first signal, receiving a second signal for selecting a second point in the focal region and for adjusting a position of the second point relative to the first point to define a degree and a direction of a rotation for the lens; and, applying the lens to the original image to produce the presentation.

According to another aspect, there is provided a method for selecting points spaced apart in an original image presented on a display surface, the method comprising: receiving a first signal for selecting a first point; while receiving the first signal, receiving a second signal for selecting a second point and for adjusting a distance between the second point and the first point in the original image; and, in response to the second signal, adjusting a scale and a position of the original image as the second point approaches a border of the original image as presented on the display surface to thereby retain presentation of the first and second points on the display surface.

According to another aspect, there is provided a method for facilitating user access to remote objects on a display surface, the method comprising: receiving a drag signal for a local object, the drag signal having at least one of an origin and a direction; selecting target objects from the remote objects on the display screen according to the drag signal and at least one of a recency of last use of the target objects, a project relationship with the local object, and a similarity of name with the local object; and, temporarily displaying the target objects in proximity to the drag signal's origin until a signal dismissing the target objects is received.

According to another aspect, there is provided a method for repositioning an object in an original image presented on a display surface, the method comprising: receiving a first signal for selecting the object at an original location; while receiving the first signal, receiving a second signal for selecting a direction and a magnitude for the repositioning of the object; determining a final location for the object by multiplying the magnitude by a predetermined value greater than one; and, moving the object to the final location.

According to another aspect, there is provided a method for generating an on-screen presentation of an off-screen object in an original image presented on a display screen, the method comprising: establishing a lens for the off-screen object, the lens having a focal region with a magnification for the off-screen object at least partially surrounded by a shoulder region across which the magnification varies to provide a continuous transition from the focal region to regions outside the lens; folding the focal region over the shoulder region to position the focal region within a border of the display screen; applying the lens to the original image to produce the on-screen presentation; and, displaying the on-screen presentation on the display screen.

In accordance with further aspects there is provided an apparatus such as a data processing system, a method for adapting this system, as well as articles of manufacture such as a computer readable medium having program instructions recorded thereon for practicing the methods.

BRIEF DESCRIPTION OF THE DRAWINGS

Further features and advantages of the embodiments will become apparent from the following detailed description, taken in combination with the appended drawings, in which.

It will be noted that throughout the appended drawings, like features are identified by like reference numerals.

DETAILED DESCRIPTION

Figure 1:
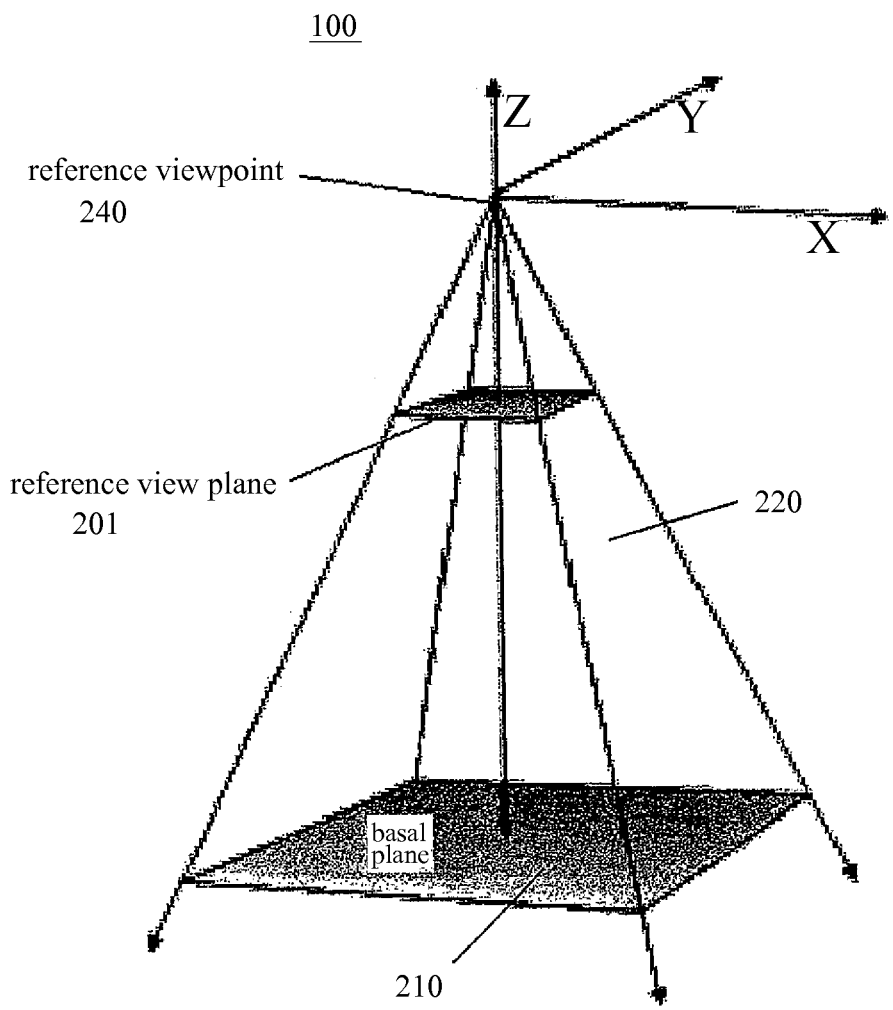
FIG. 1 is a graphical representation illustrating the geometry for constructing a three-dimensional perspective viewing frustum, relative to an x, y, z coordinate system, in accordance with elastic presentation space graphics technology.

In the following description, details are set forth to provide an understanding. In some instances, certain software, circuits, structures and methods have not been described or shown in detail in order not to obscure the techniques described herein. The term "data processing system" is used herein to refer to any machine for processing data, including the computer systems and network arrangements described herein. The present techniques may be implemented in any computer programming language provided that the operating system of the data processing system provides the facilities that may support the requirements of the present techniques. Any limitations presented would be a result of a particular type of operating system or computer programming language and would not be a limitation of the present techniques.

The "screen real estate problem" generally arises whenever large amounts of information are to be displayed on a display screen of limited size. Known tools to address this problem include panning and zooming. While these tools are suitable for a large number of visual display applications, they become less effective where sections of the visual information are spatially related, such as in layered maps and three-dimensional representations, for example. In this type of information display, panning and zooming are not as effective as much of the context of the panned or zoomed display may be hidden.

A recent solution to this problem is the application of "detail-in-context" presentation techniques. Detail-in-context is the magnification of a particular region-of-interest (the "focal region" or "detail") in a data presentation while preserving visibility of the surrounding information (the "context"). This technique has applicability to the display of large surface area media (e.g. digital maps) on computer screens of variable size including graphics workstations, laptop computers, personal digital assistants ("PDAs"), and cell phones.

In the detail-in-context discourse, differentiation is often made between the terms "representation" and "presentation". A representation is a formal system, or mapping, for specifying raw information or data that is stored in a computer or data processing system. For example, a digital map of a city is a representation of raw data including street names and the relative geographic location of streets and utilities. Such a representation may be displayed visually on a computer screen or printed on paper. On the other hand, a presentation is a spatial organization of a given representation that is appropriate for the task at hand. Thus, a presentation of a representation organizes such things as the point of view and the relative emphasis of different parts or regions of the representation. For example, a digital map of a city may be presented with a region magnified to reveal street names.

In general, a detail-in-context presentation may be considered as a distorted view (or distortion) of a portion of the original representation or image where the distortion is the result of the application of a "lens" like distortion function to the original representation. A detailed review of various detail-in-context presentation techniques such as "Elastic Presentation Space" ("EPS") (or "Pliable Display Technology" ("PDT")) may be found in a publication by Marianne S. T. Carpendale, entitled "A Framework for Elastic Presentation Space" (Carpendale, Marianne S. T., A Framework for Elastic Presentation Space (Burnaby, British Columbia: Simon Fraser University, 1999)), and incorporated herein by reference.

In general, detail-in-context data presentations are characterized by magnification of areas of an image where detail is desired, in combination with compression of a restricted range of areas of the remaining information (i.e. the context), the result typically giving the appearance of a lens having been applied to the display surface. Using the techniques described by Carpendale, points in a representation are displaced in three dimensions and a perspective projection is used to display the points on a two-dimensional presentation display. Thus, when a lens is applied to a two-dimensional continuous surface representation, for example, the resulting presentation appears to be three-dimensional. In other words, the lens transformation appears to have stretched the continuous surface in a third dimension. In EPS graphics technology, a two-dimensional visual representation is placed onto a surface; this surface is placed in three-dimensional space; the surface, containing the representation, is viewed through perspective projection; and the surface is manipulated to effect the reorganization of image details. The presentation transformation is separated into two steps: surface manipulation or distortion and perspective projection.

FIG. 1 is a graphical representation illustrating the geometry 100 for constructing a three-dimensional ("3D") perspective viewing frustum 220, relative to an x, y, z coordinate system, in accordance with elastic presentation space (EPS) graphics technology. In EPS technology, detail-in-context views of two-dimensional ("2D") visual representations are created with sight-line aligned distortions of a 2D information presentation surface within a 3D perspective viewing frustum 220. In EPS, magnification of regions of interest and the accompanying compression of the contextual region to accommodate this change in scale are produced by the movement of regions of the surface towards the viewpoint ("VP") 240 located at the apex of the pyramidal shape 220 containing the frustum. The process of projecting these transformed layouts via a perspective projection results in a new 2D layout which includes the zoomed and compressed regions. The use of the third dimension and perspective distortion to provide magnification in EPS provides a meaningful metaphor for the process of distorting the information presentation surface. The 3D manipulation of the information presentation surface in such a system is an intermediate step in the process of creating a new 2D layout of the information.

Figure 2:
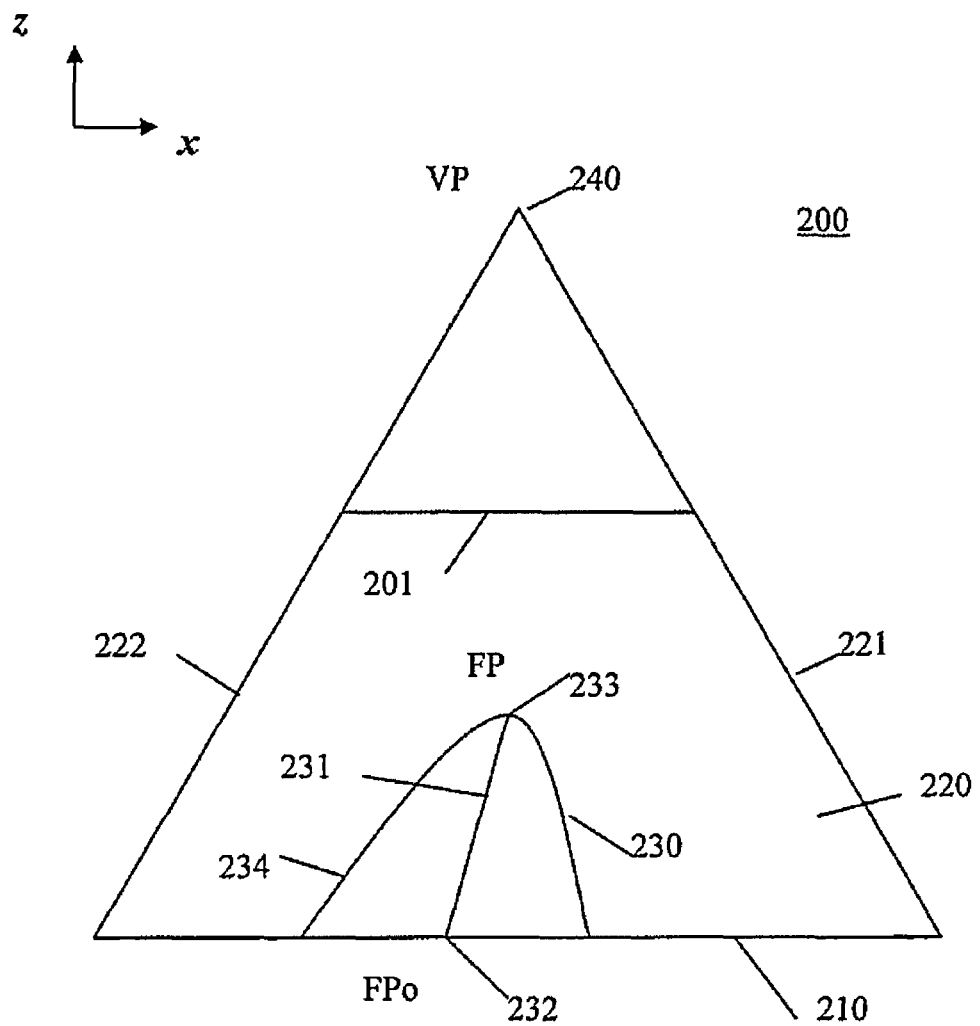
FIG. 2 is a graphical representation illustrating the geometry of a presentation in accordance with elastic presentation space graphics technology.

FIG. 2 is a graphical representation illustrating the geometry 200 of a presentation in accordance with EPS graphics technology. EPS graphics technology employs viewer-aligned perspective projections to produce detail-in-context presentations in a reference view plane 201 which may be viewed on a display. Undistorted 2D data points are located in a basal plane 210 of a 3D perspective viewing volume or frustum 220 which is defined by extreme rays 221 and 222 and the basal plane 210. The VP 240 is generally located above the centre point of the basal plane 210 and reference view plane ("RVP") 201. Points in the basal plane 210 are displaced upward onto a distorted surface 230 which is defined by a general 3D distortion function (i.e. a detail-in-context distortion basis function). The direction of the perspective projection corresponding to the distorted surface 230 is indicated by the line FPo-FP 231 drawn from a point FPo 232 in the basal plane 210 through the point FP 233 which corresponds to the focus or focal region or focal point of the distorted surface 230. Typically, the perspective projection has a direction 231 that is viewer-aligned (i.e., the points FPo 232, FP 233, and VP 240 are collinear).

EPS is applicable to multidimensional data and is well suited to implementation on a computer for dynamic detail-in-context display on an electronic display surface such as a monitor. In the case of two dimensional data, EPS is typically characterized by magnification of areas of an image where detail is desired 233, in combination with compression of a restricted range of areas of the remaining information (i.e. the context) 234, the end result typically giving the appearance of a lens 230 having been applied to the display surface. The areas of the lens 230 where compression occurs may be referred to as the "shoulder" 234 of the lens 230. The area of the representation transformed by the lens may be referred to as the "lensed area". The lensed area thus includes the focal region and the shoulder. To reiterate, the source image or representation to be viewed is located in the basal plane 210. Magnification 233 and compression 234 are achieved through elevating elements of the source image relative to the basal plane 210, and then projecting the resultant distorted surface onto the reference view plane 201. EPS performs detail-in-context presentation of n-dimensional data through the use of a procedure wherein the data is mapped into a region in an (n+1) dimensional space, manipulated through perspective projections in the (n+1) dimensional space, and then finally transformed back into n-dimensional space for presentation. EPS has numerous advantages over conventional zoom, pan, and scroll technologies, including the capability of preserving the visibility of information outside 234 the local region of interest 233.

For example, and referring to FIGS. 1 and 2, in two dimensions, EPS can be implemented through the projection of an image onto a reference plane 201 in the following manner. The source image or representation is located on a basal plane 210, and those regions of interest 233 of the image for which magnification is desired are elevated so as to move them closer to a reference plane situated between the reference viewpoint 240 and the reference view plane 201. Magnification of the focal region 233 closest to the RVP 201 varies inversely with distance from the RVP 201. As shown in FIGS. 1 and 2, compression of regions 234 outside the focal region 233 is a function of both distance from the RVP 201, and the gradient of the function describing the vertical distance from the RVP 201 with respect to horizontal distance from the focal region 233. The resultant combination of magnification 233 and compression 234 of the image as seen from the reference viewpoint 240 results in a lens-like effect similar to that of a magnifying glass applied to the image. Hence, the various functions used to vary the magnification and compression of the source image via vertical displacement from the basal plane 210 are described as lenses, lens types, or lens functions. Lens functions that describe basic lens types with point and circular focal regions, as well as certain more complex lenses and advanced capabilities such as folding, have previously been described by Carpendale.

Figure 3:
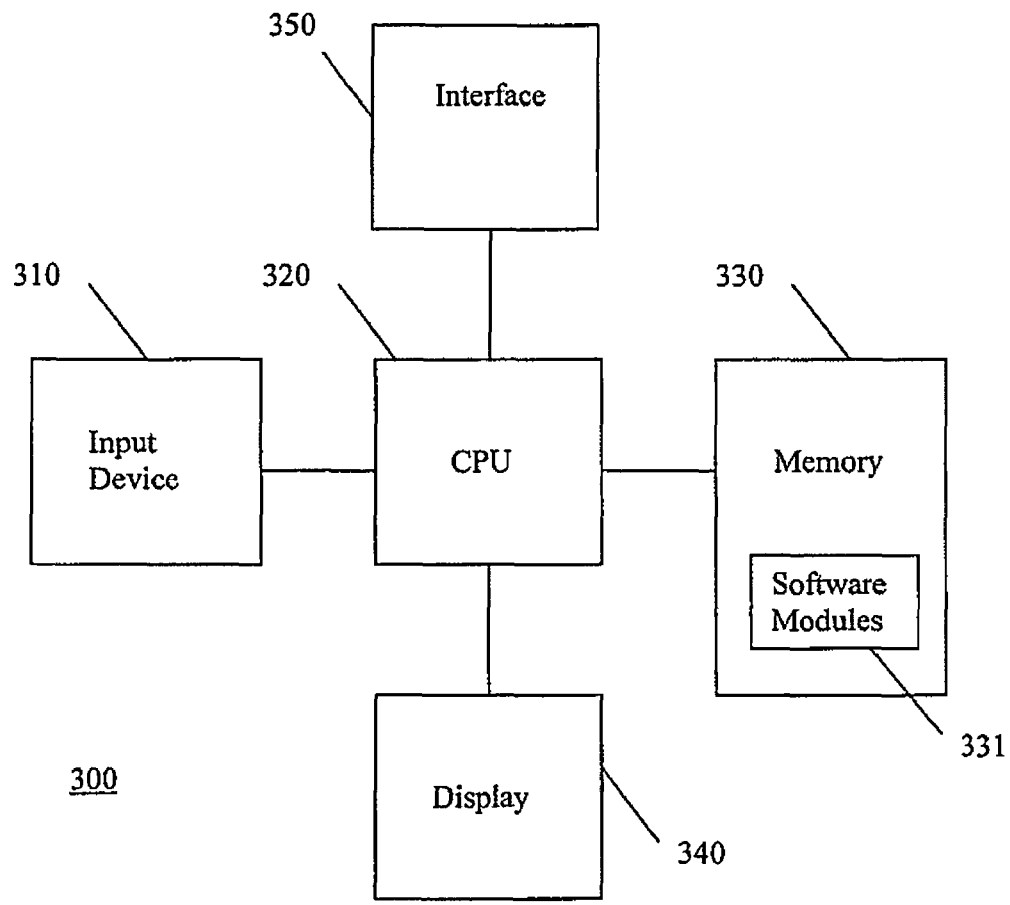
FIG. 3 is a block diagram illustrating a data processing system adapted for implementing an embodiment.

FIG. 3 is a block diagram of a data processing system 300 adapted to implement an embodiment. The data processing system 300 is suitable for generating, displaying, and adjusting detail-in-context lens presentations in conjunction with a detail-in-context graphical user interface (GUI) 400, as described below. The data processing system 300 includes an input device 310, a central processing unit ("CPU") 320, memory 330, a display 340, and an interface device 350. The input device 310 may include a keyboard, a mouse, a trackball, a touch sensitive surface or screen, a position tracking device, an eye tracking device, or a similar device. The CPU 320 may include dedicated coprocessors and memory devices. The memory 330 may include RAM, ROM, databases, or disk devices. The display 340 may include a computer screen, terminal device, a touch sensitive display surface or screen, or a hardcopy producing output device such as a printer or plotter. And, the interface device 350 may include an interface to a network (not shown) such as the Internet. Thus, the data processing system 300 may be linked to other data processing systems (not shown) by a network (not shown). The data processing system 300 has stored therein data representing sequences of instructions which when executed cause the method described herein to be performed. Of course, the data processing system 300 may contain additional software and hardware.

Thus, the data processing system 300 includes computer executable programmed instructions for directing the system 300 to implement the embodiments. The programmed instructions may be embodied in one or more software modules 331 resident in the memory 330 of the data processing system 300. Alternatively, the programmed instructions may be embodied on a computer readable medium (such as a CD disk or floppy disk) which may be used for transporting the programmed instructions to the memory 330 of the data processing system 300. Alternatively, the programmed instructions may be embedded in a computer-readable, signal-bearing medium that is uploaded to a network by a vendor or supplier of the programmed instructions, and this signal-bearing medium may be downloaded through an interface to the data processing system 300 from the network by end users or potential buyers.

As mentioned, detail-in-context presentations of data using techniques such as pliable surfaces, as described by Carpendale, are useful in presenting large amounts of information on limited-size display surfaces. Detail-in-context views allow magnification of a particular region-of-interest (the "focal region") 233 in a data presentation while preserving visibility of the surrounding information 210. In the following, a GUI 400 is described having lens control elements that can be implemented in software and applied to the control of detail-in-context data presentations. The software can be loaded into and run by the data processing system 300 of FIG. 3.

Figure 4:
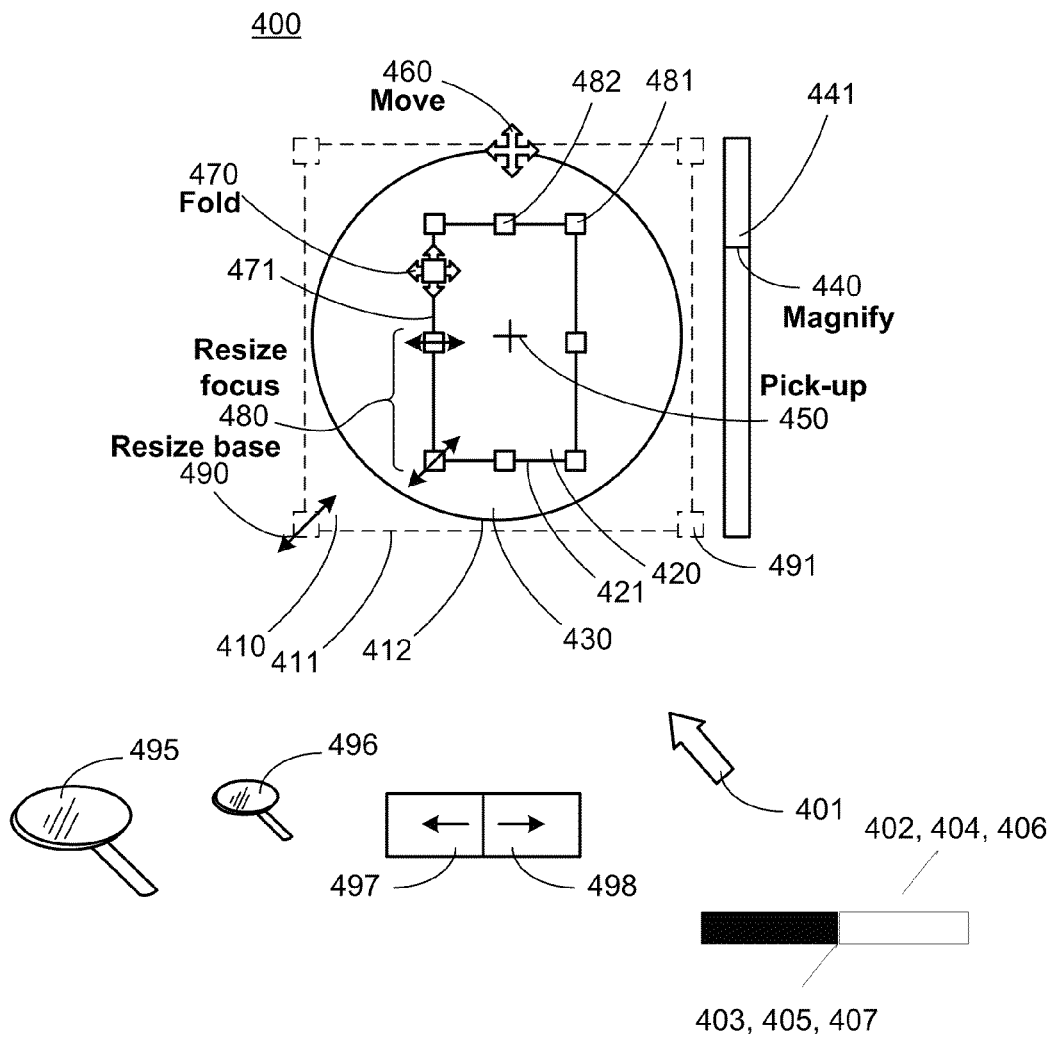
FIG. 4 is a partial screen capture illustrating a GUI having lens control elements for user interaction with detail-in-context data presentations in accordance with an embodiment.

FIG. 4 is a partial screen capture illustrating a GUI 400 having lens control elements for user interaction with detail-in-context data presentations in accordance with an embodiment. Detail-in-context data presentations are characterized by magnification of areas of an image where detail is desired, in combination with compression of a restricted range of areas of the remaining information (i.e. the context), the end result typically giving the appearance of a lens having been applied to the display screen surface. This lens 410 includes a "focal region" 420 having high magnification, a surrounding "shoulder region" 430 where information is typically visibly compressed, and a "base" 412 surrounding the shoulder region 430 and defining the extent of the lens 410. In FIG. 4, the lens 410 is shown with a circular shaped base 412 (or outline) and with a focal region 420 lying near the center of the lens 410. However, the lens 410 and focal region 420 may have any desired shape. As mentioned above, the base of the lens 412 may be coextensive with the focal region 420.

In general, the GUI 400 has lens control elements that, in combination, provide for the interactive control of the lens 410. The effective control of the characteristics of the lens 410 by a user (i.e., dynamic interaction with a detail-in-context lens) is advantageous. At any given time, one or more of these lens control elements may be made visible to the user on the display surface 340 by appearing as overlay icons on the lens 410. Interaction with each element is performed via the motion of an input or pointing device 310 (e.g., a mouse) with the motion resulting in an appropriate change in the corresponding lens characteristic. As will be described, selection of which lens control element is actively controlled by the motion of the pointing device 310 at any given time is determined by the proximity of the icon representing the pointing device 310 (e.g. cursor) on the display surface 340 to the appropriate component of the lens 410. For example, "dragging" of the pointing device at the periphery of the bounding rectangle of the lens base 412 causes a corresponding change in the size of the lens 410 (i.e. "resizing"). Thus, the GUI 400 provides the user with a visual representation of which lens control element is being adjusted through the display of one or more corresponding icons.

For ease of understanding, the following discussion will be in the context of using a two-dimensional pointing device 310 that is a mouse, but it will be understood that the techniques may be practiced with other 2D or 3D (or even greater numbers of dimensions) input devices including a trackball, a keyboard, a position tracking device, an eye tracking device, an input from a navigation device, etc.

A mouse 310 controls the position of a cursor icon 401 that is displayed on the display screen 340. The cursor 401 is moved by moving the mouse 310 over a flat surface, such as the top of a desk, in the desired direction of movement of the cursor 401. Thus, the two-dimensional movement of the mouse 310 on the flat surface translates into a corresponding two-dimensional movement of the cursor 401 on the display screen 340.

A mouse 310 typically has one or more finger actuated control buttons (i.e. mouse buttons). While the mouse buttons can be used for different functions such as selecting a menu option pointed at by the cursor 401, the disclosed techniques may use a single mouse button to "select" a lens 410 and to trace the movement of the cursor 401 along a desired path. Specifically, to select a lens 410, the cursor 401 is first located within the extent of the lens 410. In other words, the cursor 401 is "pointed" at the lens 410. Next, the mouse button is depressed and released. That is, the mouse button is "clicked". Selection is thus a point and click operation. To trace the movement of the cursor 401, the cursor 401 is located at the desired starting location, the mouse button is depressed to signal the computer 320 to activate a lens control element, and the mouse 310 is moved while maintaining the button depressed. After the desired path has been traced, the mouse button is released. This procedure is often referred to as "clicking" and "dragging" (i.e. a click and drag operation). It will be understood that a predetermined key on a keyboard 310 could also be used to activate a mouse click or drag. In the following, the term "clicking" will refer to the depression of a mouse button indicating a selection by the user and the term "dragging" will refer to the subsequent motion of the mouse 310 and cursor 401 without the release of the mouse button.

The GUI 400 may include the following lens control elements: move, pickup, resize base, resize focus, fold, magnify, zoom, and scoop. Each of these lens control elements has at least one lens control icon or alternate cursor icon associated with it. In general, when a lens 410 is selected by a user through a point and click operation, the following lens control icons may be displayed over the lens 410: pickup icon 450, base outline icon 412, base bounding rectangle icon 411, focal region bounding rectangle icon 421, handle icons 481, 482, 491, 492 magnify slide bar icon 440, zoom icon 495, and scoop slide bar icon 550 (see FIG. 5). Typically, these icons are displayed simultaneously after selection of the lens 410. In addition, when the cursor 401 is located within the extent of a selected lens 410, an alternate cursor icon 460, 470, 480, 490, 495 may be displayed over the lens 410 to replace the cursor 401 or may be displayed in combination with the cursor 401. These lens control elements, corresponding icons, and their effects on the characteristics of a lens 410 are described below with reference to FIG. 4.

In general, when a lens 410 is selected by a point and click operation, bounding rectangle icons 411, 421 are displayed surrounding the base 412 and focal region 420 of the selected lens 410 to indicate that the lens 410 has been selected. With respect to the bounding rectangles 411, 421 one might view them as glass windows enclosing the lens base 412 and focal region 420, respectively. The bounding rectangles 411, 421 include handle icons 481, 482, 491, 492 allowing for direct manipulation of the enclosed base 412 and focal region 420 as will be explained below. Thus, the bounding rectangles 411, 421 not only inform the user that the lens 410 has been selected, but also provide the user with indications as to what manipulation operations might be possible for the selected lens 410 though use of the displayed handles 481, 482, 491, 492. Note that it is well within the scope of the present techniques to provide a bounding region having a shape other than generally rectangular. Such a bounding region could be of any of a great number of shapes including oblong, oval, ovoid, conical, cubic, cylindrical, polyhedral, spherical, etc.

Moreover, the cursor 401 provides a visual cue indicating the nature of an available lens control element. As such, the cursor 401 will generally change in form by simply pointing to a different lens control icon 450, 412, 411, 421, 481, 482, 491, 492, 440, 550. For example, when resizing the base 412 of a lens 410 using a corner handle 491, the cursor 401 will change form to a resize icon 490 once it is pointed at (i.e. positioned over) the corner handle 491. The cursor 401 will remain in the form of the resize icon 490 until the cursor 401 has been moved away from the corner handle 491.

Lateral movement of a lens 410 is provided by the move lens control element of the GUI 400. This functionality is accomplished by the user first selecting the lens 410 through a point and click operation. Then, the user points to a point within the lens 410 that is other than a point lying on a lens control icon 450, 412, 411, 421, 481, 482, 491, 492, 440, 550. When the cursor 401 is so located, a move icon 460 is displayed over the lens 410 to replace the cursor 401 or may be displayed in combination with the cursor 401. The move icon 460 not only informs the user that the lens 410 may be moved, but also provides the user with indications as to what movement operations are possible for the selected lens 410. For example, the move icon 460 may include arrowheads indicating up, down, left, and right motion. Next, the lens 410 is moved by a click and drag operation in which the user clicks and drags the lens 410 to the desired position on the screen 340 and then releases the mouse button 310. The lens 410 is locked in its new position until a further pickup and move operation is performed.

Lateral movement of a lens 410 is also provided by the pickup lens control element of the GUI. This functionality is accomplished by the user first selecting the lens 410 through a point and click operation. As mentioned above, when the lens 410 is selected a pickup icon 450 is displayed over the lens 410 near the centre of the lens 410. Typically, the pickup icon 450 will be a crosshairs. In addition, a base outline 412 is displayed over the lens 410 representing the base 412 of the lens 410. The crosshairs 450 and lens outline 412 not only inform the user that the lens has been selected, but also provides the user with an indication as to the pickup operation that is possible for the selected lens 410. Next, the user points at the crosshairs 450 with the cursor 401. Then, the lens outline 412 is moved by a click and drag operation in which the user clicks and drags the crosshairs 450 to the desired position on the screen 340 and then releases the mouse button 310. The full lens 410 is then moved to the new position and is locked there until a further pickup operation is performed. In contrast to the move operation described above, with the pickup operation, it is the outline 412 of the lens 410 that the user repositions rather than the full lens 410.

Resizing of the base 412 (or outline) of a lens 410 is provided by the resize base lens control element of the GUI. After the lens 410 is selected, a bounding rectangle icon 411 is displayed surrounding the base 412. For a rectangular shaped base 412, the bounding rectangle icon 411 may be coextensive with the perimeter of the base 412. The bounding rectangle 411 includes handles 491, 492. These handles 491, 492 can be used to stretch the base 412 taller or shorter, wider or narrower, or proportionally larger or smaller. The corner handles 491 will keep the proportions the same while changing the size. The middle handles 492 (see FIG. 5) will make the base 412 taller or shorter, wider or narrower. Resizing the base 412 by the corner handles 491 will keep the base 412 in proportion. Resizing the base 412 by the middle handles 492 will change the proportions of the base 412. That is, the middle handles 492 change the aspect ratio of the base 412 (i.e. the ratio between the height and the width of the bounding rectangle 411 of the base 412). When a user points at a handle 491, 492 with the cursor 401 a resize icon 490 may be displayed over the handle 491, 492 to replace the cursor 401 or may be displayed in combination with the cursor 401. The resize icon 490 not only informs the user that the handle 491, 492 may be selected, but also provides the user with indications as to the resizing operations that are possible with the selected handle. For example, the resize icon 490 for a corner handle 491 may include arrows indicating proportional resizing. The resize icon (not shown) for a middle handle 492 may include arrows indicating width resizing or height resizing. After pointing at the desired handle 491, 492 the user would click and drag the handle 491, 492 until the desired shape and size for the base 412 is reached. Once the desired shape and size are reached, the user would release the mouse button 310. The base 412 of the lens 410 is then locked in its new size and shape until a further base resize operation is performed.

Resizing of the focal region 420 of a lens 410 is provided by the resize focus lens control element of the GUI. After the lens 410 is selected, a bounding rectangle icon 421 is displayed surrounding the focal region 420. For a rectangular shaped focal region 420, the bounding rectangle icon 421 may be coextensive with the perimeter of the focal region 420. The bounding rectangle 421 includes handles 481, 482. These handles 481, 482 can be used to stretch the focal region 420 taller or shorter, wider or narrower, or proportionally larger or smaller. The corner handles 481 will keep the proportions the same while changing the size. The middle handles 482 will make the focal region 420 taller or shorter, wider or narrower. Resizing the focal region 420 by the corner handles 481 will keep the focal region 420 in proportion. Resizing the focal region 420 by the middle handles 482 will change the proportions of the focal region 420. That is, the middle handles 482 change the aspect ratio of the focal region 420 (i.e. the ratio between the height and the width of the bounding rectangle 421 of the focal region 420). When a user points at a handle 481, 482 with the cursor 401 a resize icon 480 may be displayed over the handle 481, 482 to replace the cursor 401 or may be displayed in combination with the cursor 401. The resize icon 480 not only informs the user that a handle 481, 482 may be selected, but also provides the user with indications as to the resizing operations that are possible with the selected handle. For example, the resize icon 480 for a corner handle 481 may include arrows indicating proportional resizing. The resize icon 480 for a middle handle 482 may include arrows indicating width resizing or height resizing. After pointing at the desired handle 481, 482, the user would click and drag the handle 481, 482 until the desired shape and size for the focal region 420 is reached. Once the desired shape and size are reached, the user would release the mouse button 310. The focal region 420 is then locked in its new size and shape until a further focus resize operation is performed.

Folding of the focal region 420 of a lens 410 is provided by the fold control element of the GUI. In general, control of the degree and direction of folding (i.e. skewing of the viewer aligned vector 231 as described by Carpendale) is accomplished by a click and drag operation on a point 471, other than a handle 481, 482, on the bounding rectangle 421 surrounding the focal region 420. The direction of folding is determined by the direction in which the point 471 is dragged. The degree of folding is determined by the magnitude of the translation of the cursor 401 during the drag. In general, the direction and degree of folding corresponds to the relative displacement of the focus 420 with respect to the lens base 410. In other words, and referring to FIG. 2, the direction and degree of folding corresponds to the displacement of the point FP 233 relative to the point FPo 232, where the vector joining the points FPo 232 and FP 233 defines the viewer aligned vector 231. In particular, after the lens 410 is selected, a bounding rectangle icon 421 is displayed surrounding the focal region 420. The bounding rectangle 421 includes handles 481, 482. When a user points at a point 471, other than a handle 481, 482, on the bounding rectangle 421 surrounding the focal region 420 with the cursor 401, a fold icon 470 may be displayed over the point 471 to replace the cursor 401 or may be displayed in combination with the cursor 401. The fold icon 470 not only informs the user that a point 471 on the bounding rectangle 421 may be selected, but also provides the user with indications as to what fold operations are possible. For example, the fold icon 470 may include arrowheads indicating up, down, left, and right motion. By choosing a point 471, other than a handle 481, 482, on the bounding rectangle 421 a user may control the degree and direction of folding. To control the direction of folding, the user would click on the point 471 and drag in the desired direction of folding. To control the degree of folding, the user would drag to a greater or lesser degree in the desired direction of folding. Once the desired direction and degree of folding is reached, the user would release the mouse button 310. The lens 410 is then locked with the selected fold until a further fold operation is performed.

Magnification of the lens 410 is provided by the magnify lens control element of the GUI. After the lens 410 is selected, the magnify control is presented to the user as a slide bar icon 440 near or adjacent to the lens 410 and typically to one side of the lens 410. Sliding the bar 441 of the slide bar 440 results in a proportional change in the magnification of the lens 410. The slide bar 440 not only informs the user that magnification of the lens 410 may be selected, but also provides the user with an indication as to what level of magnification is possible. The slide bar 440 includes a bar 441 that may be slid up and down, or left and right, to adjust and indicate the level of magnification. To control the level of magnification, the user would click on the bar 441 of the slide bar 440 and drag in the direction of desired magnification level. Once the desired level of magnification is reached, the user would release the mouse button 310. The lens 410 is then locked with the selected magnification until a further magnification operation is performed. In general, the focal region 420 is an area of the lens 410 having constant magnification (i.e. if the focal region is a plane). Again referring to FIGS. 1 and 2, magnification of the focal region 420, 233 varies inversely with the distance from the focal region 420, 233 to the reference view plane (RVP) 201. Magnification of areas lying in the shoulder region 430 of the lens 410 also varies inversely with their distance from the RVP 201. Thus, magnification of areas lying in the shoulder region 430 will range from unity at the base 412 to the level of magnification of the focal region 420.

Zoom functionality is provided by the zoom lens control element of the GUI. Referring to FIG. 2, the zoom lens control element, for example, allows a user to quickly navigate to a region of interest 233 within a continuous view of a larger presentation 210 and then zoom in to that region of interest 233 for detailed viewing or editing. Referring to FIG. 4, the combined presentation area covered by the focal region 420 and shoulder region 430 and surrounded by the base 412 may be referred to as the "extent of the lens". Similarly, the presentation area covered by the focal region 420 may be referred to as the "extent of the focal region". The extent of the lens may be indicated to a user by a base bounding rectangle 411 when the lens 410 is selected. The extent of the lens may also be indicated by an arbitrarily shaped figure that bounds or is coincident with the perimeter of the base 412. Similarly, the extent of the focal region may be indicated by a second bounding rectangle 421 or arbitrarily shaped figure. The zoom lens control element allows a user to: (a) "zoom in" to the extent of the focal region such that the extent of the focal region fills the display screen 340 (i.e. "zoom to focal region extent"); (b) "zoom in" to the extent of the lens such that the extent of the lens fills the display screen 340 (i.e. "zoom to lens extent"); or, (c) "zoom in" to the area lying outside of the extent of the focal region such that the area without the focal region is magnified to the same level as the extent of the focal region (i.e. "zoom to scale").

In particular, after the lens 410 is selected, a bounding rectangle icon 411 is displayed surrounding the base 412 and a bounding rectangle icon 421 is displayed surrounding the focal region 420. Zoom functionality is accomplished by the user first selecting the zoom icon 495 through a point and click operation When a user selects zoom functionality, a zoom cursor icon 496 may be displayed to replace the cursor 401 or may be displayed in combination with the cursor 401. The zoom cursor icon 496 provides the user with indications as to what zoom operations are possible. For example, the zoom cursor icon 496 may include a magnifying glass. By choosing a point within the extent of the focal region, within the extent of the lens, or without the extent of the lens, the user may control the zoom function. To zoom in to the extent of the focal region such that the extent of the focal region fills the display screen 340 (i.e. "zoom to focal region extent"), the user would point and click within the extent of the focal region. To zoom in to the extent of the lens such that the extent of the lens fills the display screen 340 (i.e. "zoom to lens extent"), the user would point and click within the extent of the lens. Or, to zoom in to the presentation area without the extent of the focal region, such that the area without the extent of the focal region is magnified to the same level as the extent of the focal region (i.e. "zoom to scale"), the user would point and click without the extent of the lens. After the point and click operation is complete, the presentation is locked with the selected zoom until a further zoom operation is performed.

Alternatively, rather than choosing a point within the extent of the focal region, within the extent of the lens, or without the extent of the lens to select the zoom function, a zoom function menu with multiple items (not shown) or multiple zoom function icons (not shown) may be used for zoom function selection. The zoom function menu may be presented as a pull-down menu. The zoom function icons may be presented in a toolbar or adjacent to the lens 410 when the lens is selected. Individual zoom function menu items or zoom function icons may be provided for each of the "zoom to focal region extent", "zoom to lens extent", and "zoom to scale" functions described above. In this alternative, after the lens 410 is selected, a bounding rectangle icon 411 may be displayed surrounding the base 412 and a bounding rectangle icon 421 may be displayed surrounding the focal region 420. Zoom functionality is accomplished by the user selecting a zoom function from the zoom function menu or via the zoom function icons using a point and click operation. In this way, a zoom function may be selected without considering the position of the cursor 401 within the lens 410.

The concavity or "scoop" of the shoulder region 430 of the lens 410 is provided by the scoop lens control element of the GUI. After the lens 410 is selected, the scoop control is presented to the user as a slide bar icon 550 (see FIG. 5) near or adjacent to the lens 410 and typically below the lens 410. Sliding the bar 551 (see FIG. 5) of the slide bar 550 results in a proportional change in the concavity or scoop of the shoulder region 430 of the lens 410. The slide bar 550 not only informs the user that the shape of the shoulder region 430 of the lens 410 may be selected, but also provides the user with an indication as to what degree of shaping is possible. The slide bar 550 includes a bar 551 that may be slid left and right, or up and down, to adjust and indicate the degree of scooping. To control the degree of scooping, the user would click on the bar 551 of the slide bar 550 and drag in the direction of desired scooping degree. Once the desired degree of scooping is reached, the user would release the mouse button 310. The lens 410 is then locked with the selected scoop until a further scooping operation is performed.

Figure 5:
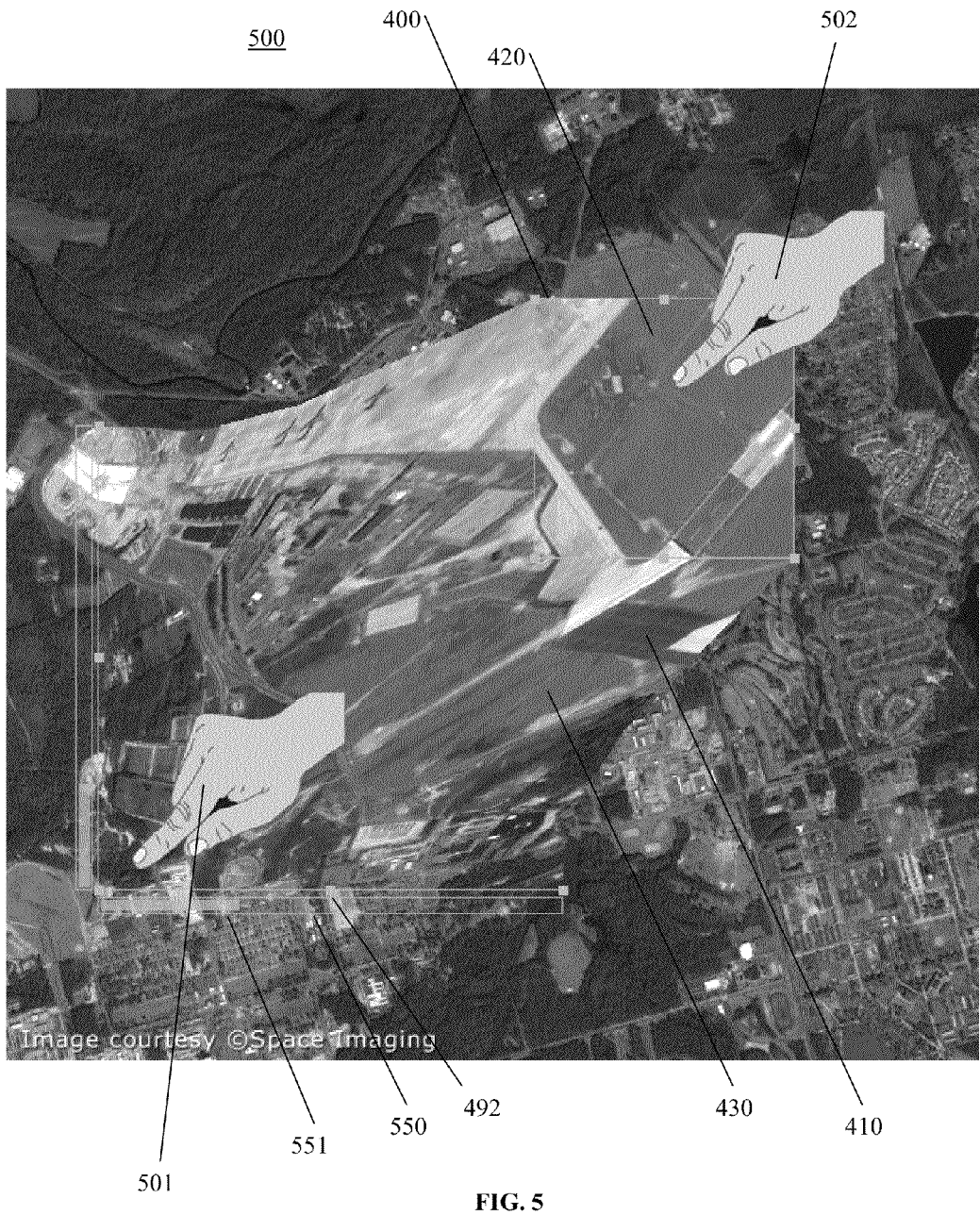
FIG. 5 is a screen capture illustrating a presentation having a folded lens and GUI in which hand icons are used to indicate locations on a display surface where a user may touch the display surface to adjust the folding of the lens in accordance with an embodiment.

Advantageously, a user may choose to hide one or more lens control icons 450, 412, 411, 421, 481, 482, 491, 492, 440, 495, 550 shown in FIGS. 4 and 5 from view so as not to impede the user's view of the image within the lens 410. This may be helpful, for example, during an editing or move operation. A user may select this option through means such as a menu, toolbar, or lens property dialog box.

In addition, the GUI 400 maintains a record of control element operations such that the user may restore pre-operation presentations. This record of operations may be accessed by or presented to the user through "Undo" and "Redo" icons 497, 498, through a pull-down operation history menu (not shown), or through a toolbar.

Thus, detail-in-context data viewing techniques allow a user to view multiple levels of detail or resolution on one display 340. The appearance of the data display or presentation is that of one or more virtual lenses showing detail 233 within the context of a larger area view 210. Using multiple lenses in detail-in-context data presentations may be used to compare two regions of interest at the same time. Folding enhances this comparison by allowing the user to pull the regions of interest closer together. Moreover, using detail-in-context technology, an area of interest can be magnified to pixel level resolution, or to any level of detail available from the source information, for in-depth review. The digital images may include graphic images, maps, photographic images, or text documents, and the source information may be in raster, vector, or text form.

For example, in order to view a selected object or area in detail, a user can define a lens 410 over the object using the GUI 400. The lens 410 may be introduced to the original image to form the a presentation through the use of a pull-down menu selection, tool bar icon, etc. Using lens control elements for the GUI 400, such as move, pickup, resize base, resize focus, fold, magnify, zoom, and scoop, as described above, the user adjusts the lens 410 for detailed viewing of the object or area. Using the magnify lens control element, for example, the user may magnify the focal region 420 of the lens 410 to pixel quality resolution revealing detailed information pertaining to the selected object or area. That is, a base image (i.e., the image outside the extent of the lens) is displayed at a low resolution while a lens image (i.e., the image within the extent of the lens) is displayed at a resolution based on a user selected magnification 440, 441.

In operation, the data processing system 300 employs EPS techniques with an input device 310 and GUI 400 for selecting objects or areas for detailed display to a user on a display screen 340. Data representing an original image or representation is received by the CPU 320 of the data processing system 300. Using EPS techniques, the CPU 320 processes the data in accordance with instructions received from the user via an input device 310 and GUI 400 to produce a detail-in-context presentation. The presentation is presented to the user on a display screen 340. It will be understood that the CPU 320 may apply a transformation to the shoulder region 430 surrounding the region-of-interest 420 to affect blending or folding in accordance with EPS techniques. For example, the transformation may map the region-of-interest 420 and/or shoulder region 430 to a predefined lens surface, defined by a transformation or distortion function and having a variety of shapes, using EPS techniques. Or, the lens 410 may be simply coextensive with the region-of-interest 420.

The lens control elements of the GUI 400 are adjusted by the user via an input device 310 to control the characteristics of the lens 410 in the detail-in-context presentation. Using an input device 310 such as a mouse, a user adjusts parameters of the lens 410 using icons and scroll bars of the GUI 400 that are displayed over the lens 410 on the display screen 340. The user may also adjust parameters of the image of the full scene. Signals representing input device 310 movements and selections are transmitted to the CPU 320 of the data processing system 300 where they are translated into instructions for lens control.

Moreover, the lens 410 may be added to the presentation before or after the object or area is selected. That is, the user may first add a lens 410 to a presentation or the user may move a pre-existing lens into place over the selected object or area. The lens 410 may be introduced to the original image to form the presentation through the use of a pull-down menu selection, tool bar icon, etc.

Advantageously, by using a detail-in-context lens 410 to select an object or area for detailed information gathering, a user can view a large area (i.e., outside the extent of the lens 410) while focusing in on a smaller area (or within the focal region 420 of the lens 410) surrounding the selected object. This makes it possible for a user to accurately gather detailed information without losing visibility or context of the portion of the original image surrounding the selected object.

Now, a touch sensitive direct interaction multi-input display surface 340 (often implemented as tabletops, wallscreens, or other formats) allows a computer system 300 to sense touches on the surface 340 by a variety of users simultaneously. In effect, the display surface 340 combines the function of a traditional display screen 340 and one or more input devices 310. Several users can simultaneously touch their fingers or hands to the surface 340 to manipulate data presented thereon. An individual user can also simultaneously use both hands or several fingers in order to perform multi-point interaction with the computer system 300. In the following, methods are described in which touch sensitive surfaces or display surfaces 340 can be used in conjunction with detail-in-context lenses 410 to generate and adjust detail-in-context presentations. Also described are methods related to presentation systems that don't necessarily involve touch sensitive surfaces or display surfaces 340. A user may enable input through the touch sensitive surface or display surface 340 by making an appropriate selection from a menu or toolbar.

FIG. 5 is a screen capture illustrating a presentation 500 having a folded lens 410 and GUI 400 in which hand icons 501, 502 are used to indicate locations 420, 430 on a display surface 340 where a user may touch the display surface 340 to adjust the folding of the lens 410 in accordance with an embodiment. In this embodiment, the user may adjust the folding of the lens 410 using one or both hands 501, 502. In controlling the folding of a lens 410 as described above, the action of dragging the focal region 420 of the lens 410 outside of the bounding rectangle 411 of the lens 410, performed using relatively small-sized control icons, can be problematic in cases where input resolution is not great. According to one embodiment, a method of enabling folding is provided that employs a direct interaction approach in which the lens 410 may be manipulated as if it were made from a clay-like substance. This embodiment allows for manipulation of the lens 410 via direct touching of the display surface on which it is presented with one or both of the user's hands.

In this embodiment, if a user touches the lens 410 presented on the display surface 340 with a single hand (or finger) and then drags his or her hand (or finger) across the display surface 340, the lens 410 will be repositioned as a single unit. That is, both the focal region 420 and shoulder region 430 will retain their relative positions. This embodiment thus includes a method of lateral repositioning of the lens 410. Now, in order to fold the lens 410 according to this embodiment, the user touches the lens 410 in the base or shoulder region 430 with a first hand (or finger) 501 and in the focal region 420 with a second hand (or finger) 502. When the user draws his or her hands apart, while maintaining contact with the display surface 340, the presentation of the lens 410 is stretched, as if it were clay. The focal region 420 can be pulled outside of the bounds 411, 412 of the lens 410 to create a folded lens 410 as shown in FIG. 5 by the user repositioning his or her second hand 502. In addition, if the user moves his or her first hand 501, the base 430 of the lens 410 can be repositioned. Thus, the focal region 420 and base 430 can be manipulated independently or simultaneously to create a folded lens 410. Clay is used as a metaphor here, rather than rubber, because with rubber the lens would "snap" back to its original shape once released rather than retaining its stretched (i.e., folded) form as is the case with this embodiment.

Now, multiple users working with a touch-sensitive surface or display surface may be located on different sides of the surface (e.g., the users may be sitting around a tabletop display surface). With different perspectives, these users will have different preferences with respect to the orientation of objects presented on the display surface. Consequently, there is a need for rotation (or twisting) of visual objects presented on the display surface to facilitate different user orientation preferences. According to one embodiment, detail-in-context lenses satisfy this need by incorporating a rotational component in their displacement or distortion functions. In particular, according to this embodiment, the more a point is magnified by the lens (i.e., geometrically closer to the center of the lens), the more it is rotated (or twisted) about the central axis of the lens.

Figures 6, 7:
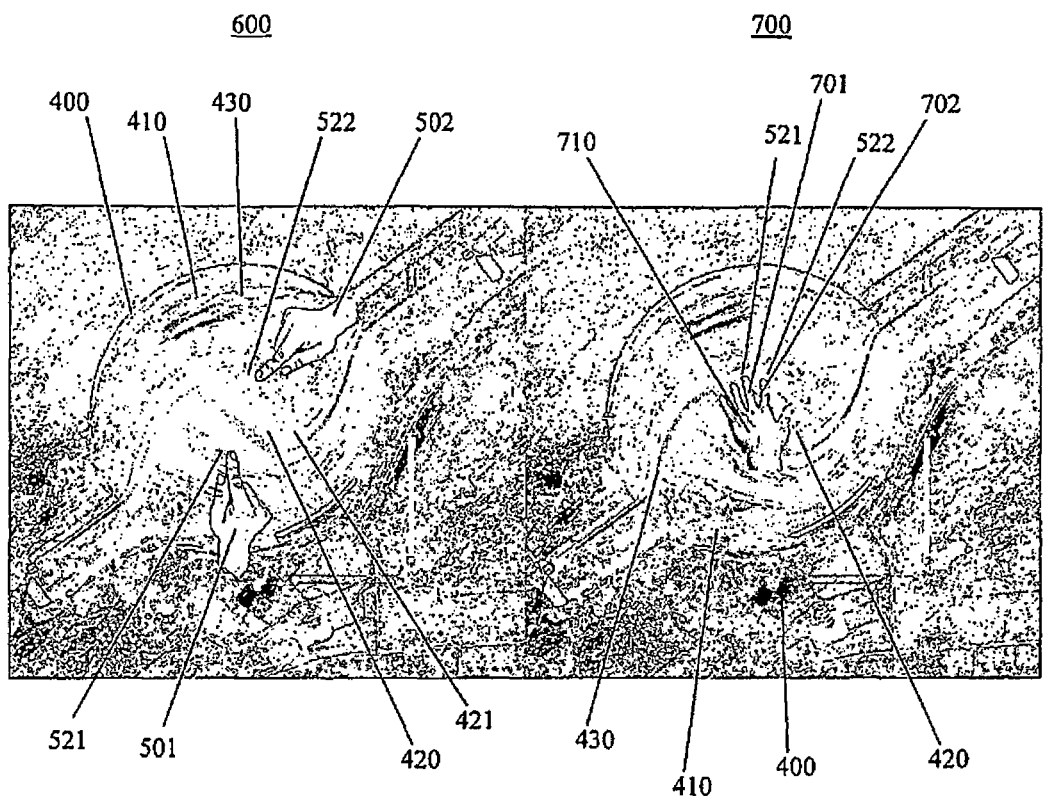
FIG. 6 is a screen capture illustrating a presentation having a twisted or rotated lens and GUI in which hand icons are used to indicate locations on a display surface where a user may touch the display surface to adjust twist or rotation of the lens in accordance with an embodiment.
FIG. 7 is a screen capture illustrating a presentation of a twisted or rotated lens and GUI in which a single hand icon having splayed fingers is used to indicate the locations on the display surface where a user may touch the display surface to adjust twist or rotation of the lens in accordance with an embodiment.

FIG. 6 is a screen capture illustrating a presentation 600 having a twisted or rotated lens 410 and GUI 400 in which hand icons 501, 502 are used to indicate locations 521, 522 on a display surface 340 where a user may touch the display surface 340 to adjust twist or rotation of the lens 410 in accordance with an embodiment. FIG. 7 is a screen capture illustrating a presentation 700 of a twisted or rotated lens 410 and GUI 400 in which a single hand icon 710 having splayed fingers 701, 702 is used to indicate the locations 521, 522 on the display surface 340 where a user may touch the display surface 340 to adjust twist or rotation of the lens 410 in accordance with an embodiment. Thus, FIGS. 6 and 7 illustrate adjustment of rotation/twist using two hands 501, 502 and a single hand 710, respectively. In FIGS. 6 and 7, the hands 501, 502 or fingers 701, 702 on a hand 710 are moved in a clockwise direction to generate a corresponding clockwise rotation of the lens 410.

Referring to FIG. 7, adjustment of the rotation in a lens 410 on a touch-sensitive display surface 340 capable of sensing multiple touch points is accomplished by sensing two fingertips 701, 702 from a user's hand 710 splayed and pressed against the presentation of the lens 410 to indicate two respective locations 521, 522 within the focal region 420 of the lens 410. When the fingers 701, 702 are rotated around their center, as a user would naturally do if the user were, for example, turning a piece of paper on a table, the rotation of the lens 410 is changed correspondingly. Referring to FIG. 6, adjustment of the rotation in the lens 410 can also be performed using a single finger from each of two hands 501, 502. The user places a finger from each hand 501, 502, each at a respective location 521, 522 in the focal region 420 of the lens 410 (e.g., near the perimeter 421 of the focal region 420), and then moves both fingers either clockwise or counter clockwise, in order to initiate a rotation in the lens 410.

Another aspect of the "screen real estate problem" is that of accurately selecting points in large representations or images. It is often necessary, for example in a measurement task, to simultaneously and accurately specify the location of two points in a representation presented on a display screen or surface 340. The two points may be spaced very far apart from one another, relative to the desired level of accuracy. According to one embodiment, as described below, a method is provided for specifying the location of such points for a computer system 300 equipped with a keyboard, mouse, and display screen. According to another embodiment, a method is provided for specifying the location of the points for a computer system 300 equipped with a touch sensitive surface or display surface 340.

With respect to the case of mouse/keyboard interaction, consider a scenario where a user has zoomed in on a region-of-interest in a representation where the first of two points of interest is located. The user selects the first point by positioning the cursor over the point and by clicking the mouse button. The user then begins a cursor dragging operation away from the first point toward the location of the second point. Now, assuming the second point is located off the edge of the display screen, the user drags the cursor to the edge of the display screen in the direction of the second point. When the cursor reaches the edge of the display screen, the view simultaneously zooms out and pans or scrolls in the direction of cursor movement, such that the viewable area increases and both points remain in view near respective edges of the viewable area. As the panning or scrolling occurs, according to this embodiment, two lenses may appear in the presentation, one over the first specified point, and one over the current cursor location. The magnification of each lens can be automatically set such that the focal region of each lens displays each respective point at the same scale as the original image (i.e., the scale or zoom level of the presentation when the first point was selected). The user continues to pan or scroll the view until the location of the second point of interest is visible on the display screen. The user then positions the cursor over the second point, using the lens which shows the second point in its focal region at the original image scale, and places the point.

With respect to the case of touch sensitive surface or display surface interaction, this interaction operates identically to the mouse/keyboard interaction described above with the following exceptions. First, a finger from each of a user's hands is used to specify each of the two points on the touch sensitive display surface. Second, either finger can be used to scroll or pan the view to adjust the locations of the points. Thus, according to this embodiment, the two points need not be specified sequentially, as in the case of mouse/keyboard interaction as described above. Advantageously, both points can be adjusted dynamically and simultaneously until the desired locations for the two points are selected by the user.

Another aspect of the "screen real estate problem" is that of accessing remote on-screen content from a current working location. Most solutions for accessing remote content from a current working location involve moving from the current location to the remote content area. In U.S. Patent Application Publication Number 2004/0150664 by Baudisch and in a recent paper by Baudisch (i.e., Baudisch, P. et al., "Drag-and-Pop and Drag-and-Pick: Techniques for Accessing Remote Screen Content on Touch- and Pen-Operated Systems", Proceedings of Interact 2003, Zurich, Switzerland, pp. 57-64), both of which are incorporated herein by reference, a "drag-and-pop" method for accessing remote screen content is described. In this method a user's "activation gesture" is detected. The activation gesture may include an empty or nonempty selection with the nonempty selection having an associated source icon. The activation gesture also includes an origin and a direction. Upon detecting the activation gesture, a target region is determined according to the activation gesture. Target icons are selected from those remote icons within the target region. The selected target icons are temporarily displayed in proximity to the activation gesture's location until an action dismissing the target icons is detected. The target icons may be selected according to their ability to respond to and operate on the content represented by the source icon. Thus, Baudisch presents a solution to the problem of accessing remote content from a current working location by temporarily displaying remote content in the proximity of the working area in response to a user's gesture indicating that the remote content should be temporarily relocated. One problem with Baudisch's method is that possible targets are only filtered based on compatibility with the dragged or source object. This can result in many possible targets.

According to embodiments, additional methods are provided to filter or prune the number of candidate target objects to be temporarily relocated from a remote area to a working area on a display screen or surface. According to one embodiment, filtering of remote content is performed according to recency of last use. Objects most recently used are selected as possible targets. According to another embodiment, filtering of remote content is linked to a current project. That is, project related objects are selected. These can be determined based on pre-set object categories, or determined based on which objects have been opened simultaneously, or which objects have had content copied to one another previously. According to another embodiment, filtering is performed based on similarity of name to the dragged object. For example, an object named "Peters_-Proposal.doc" would naturally fit with a document called "Peters_Image.jpg." According to another embodiment, objects that score low on one or more of these filtering metrics can either be excluded entirely from the targeted objects or can be de-emphasized (e.g., by reducing their size, positioning them further away from the cursor, making them transparent, etc.).

A further aspect of the "screen real estate problem" is that of enabling users to drag objects large distances. While Baudisch's method may be useful for dragging one object to another object (e.g., a file onto a folder), it is not useful for general positioning tasks (e.g., dragging an image from one side of a tabletop display to another side of the tabletop display). Thus, especially for large displays, methods for enabling users to drag objects large distances are desired. According to one embodiment, a method for dragging objects large distances is provided through multiplying or magnifying the effect of a drag operation. According to this embodiment, if a user physically drags an object presented on a display screen or surface a distance of x units in a selected direction, the object actually moves x*y units in that direction, where y>1. In other words, the drag operation is multiplied or magnified. Multiplied or magnified dragging may be implemented in several ways, as will be described below, depending on the configuration of the computer system 300.

With respect to the case of mouse/keyboard interaction, a toggle key on the keyboard, such as the control or alt. key, may be selected by a user to indicate whether the user wants to have drag operations magnified. While the key is held down, the selected object moves at a faster speed during the drag operation than usual. This speed can depend solely on the speed at which the mouse travels, or it can depend on other factors. These other factors can include: the size of the entire screen; the size of the current window; and, the physical distance a mouse would need to be moved to virtually traverse the cursor across either the window or the screen.

Figures 8, 9:
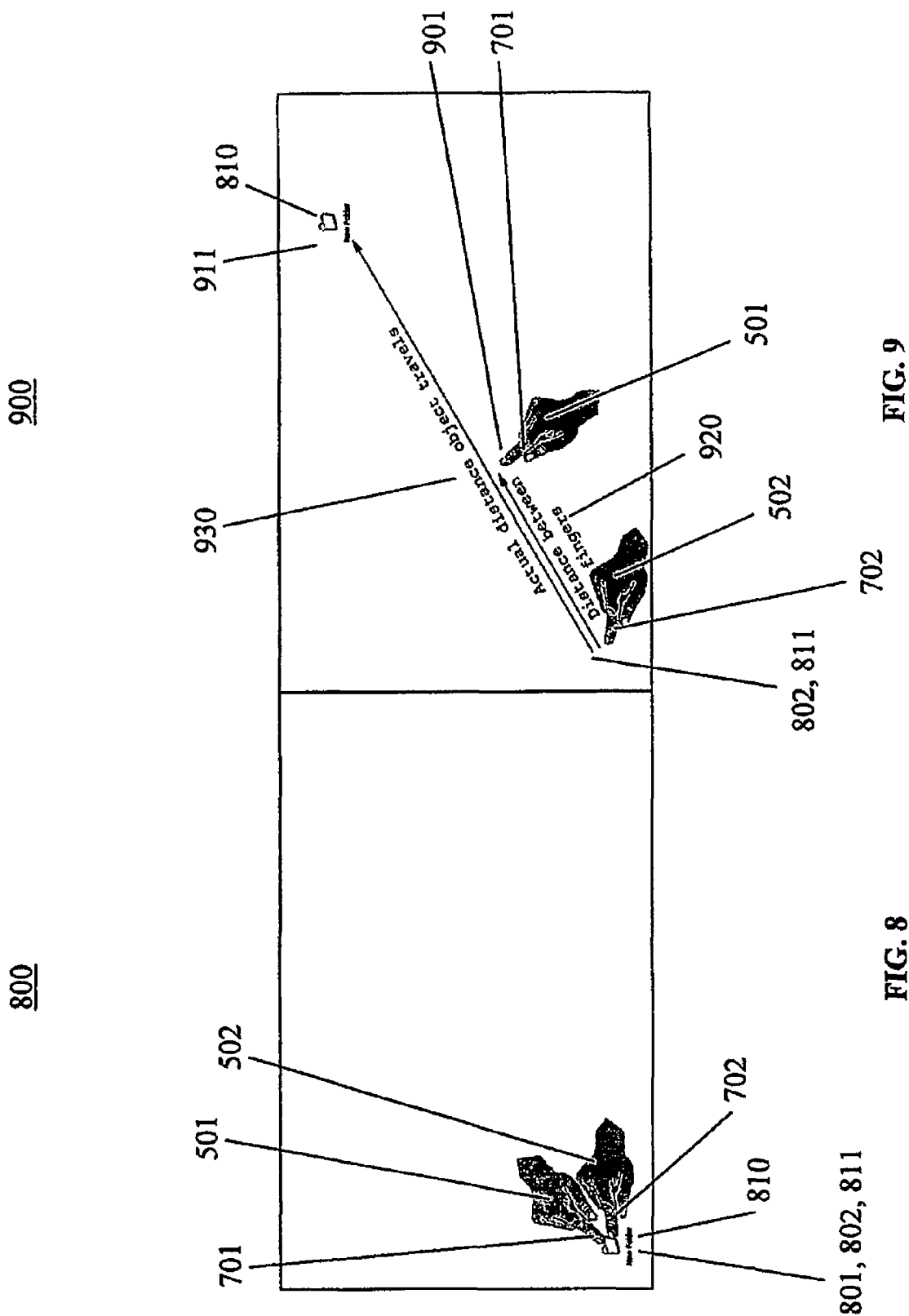
FIG. 8 is a screen capture illustrating a presentation of an object at an initial location prior to a magnified drag operation in which hand icons are used to indicate the locations of a user's fingers on a touch sensitive display surface in accordance with an embodiment.
FIG. 9 is a screen capture illustrating a presentation of the object of FIG. 8 at a final location after the magnified draft operation is performed in which hand icons are used to indicate the locations of a user's fingers on the touch sensitive display surface in accordance with an embodiment.

With respect to the case of touch sensitive surface or display surface interaction, refer to FIGS. 8 and 9. FIG. 8 is a screen capture illustrating a presentation 800 of an object 810 at an initial location 811 prior to a magnified drag operation in which hand icons 501, 502 are used to indicate the locations 801, 802 of a user's fingers 701, 702 on a touch sensitive display surface 340 in accordance with an embodiment. FIG. 9 is a screen capture illustrating a presentation 900 of the object 810 of FIG. 8 at a final location 911 after the magnified drag operation is performed in which hand icons 501, 502 are used to indicate the locations 901, 802 of a user's fingers 701, 702 on the touch sensitive display surface 340 in accordance with an embodiment. On touch-sensitive tabletop devices and display surfaces with the capacity to detect two-handed input, multiplied dragging can be performed by a user first pressing a finger 701, 702 from each hand 501, 502 onto an object 810 at an original location 811 presented on the display 340. As shown in FIG. 8, the locations 801, 802 of the first and second fingers 701, 702 on the display surface thus initially correspond to the original location 811 of the object 810. Next, the user drags his or her first finger 701 in the desired direction of the drag operation to a final location 901 for the finger as shown in FIG. 9. The second finger 702 stays at the original location 811, 802. The actual distance between the fingers x (920 in FIG. 9) is multiplied by a factor y to give an actual distance the object travels x*y (930 in FIG. 9) in the desired direction of the drag operation. The final location 911 for the object 810 is shown in FIG. 9. The motion by the user is similar to what a user would perform if he or she were stretching a rubber band between a finger on each hand. The use of two fingers 701, 702 (or hands 501, 502) is to indicate to the system 300 that a magnified drag is intended, as opposed to a normal drag operation, which would be performed using only one finger (or hand).

According to one embodiment, once the user has performed the multiplied drag using a first finger 701 (or hand 501), as shown in FIGS. 8 and 9, by keeping his or her second finger 702 (or hand 502) in contact with the display screen, the user may now perform fine positioning of the object 810 by using this second finger 702 (or hand 502). In this embodiment, movement of the second finger 702 in the vicinity of the origin 811 of the drag operation will have a corresponding non-magnified impact on the positioning of the object 810 in the target area 911. In this way, the first finger 701 may be used for rough positioning of the object 810 while the second finger 702 may be used for subsequent fine positioning of the object 810.

Yet another aspect of the "screen real estate problem" is that of indicating to users the location and nature of off-screen objects. In a recent paper by Baudisch and Rosenholtz (Baudisch, P. and R. Rosenholtz, "Halo: A Technique for Visualizing Off-Screen Locations", Proceedings of ACM Conference on Human Factors in Computing Systems (CHI) 2003, Fort Lauderdale, Fla., pp. 34-43), which is incorporated herein by reference, a "halo" method for indicating the location of off-screen objects to users is described. In this method, off-screen objects are surrounded with rings that are just large enough to reach into the border region of the display window. From the portion of the ring that is visible on-screen, a user can infer the off-screen location of the object at the center of the ring. One problem with this solution, of course, is that while the location of the off-screen object is indicated to the user, the nature of that object is not. That is, the user cannot see the object itself.

This problem also occurs in EPS applications. For example, if a fisheye lens is applied to an original image (e.g., a map) to generate a detail-in-context presentation and the lens stays fixed at its original location in the image, then panning can cause the lens to move off-screen where it may be lost to the user. On the other hand, if the lens remains stationary with respect to screen coordinates, then panning will cause the contents displayed in the lens to change. According to one embodiment, the lens may present the detailed information for the location in the original image to which is was originally applied while providing awareness as to what objects are located off-screen. According to this embodiment, lens folding is used to provide off-screen awareness of objects to which lenses have been applied. In particular, lens folding is used to the keep the focal region of the lens applied to an object-of-interest on-screen at the border of the viewing area.

Figure 10:
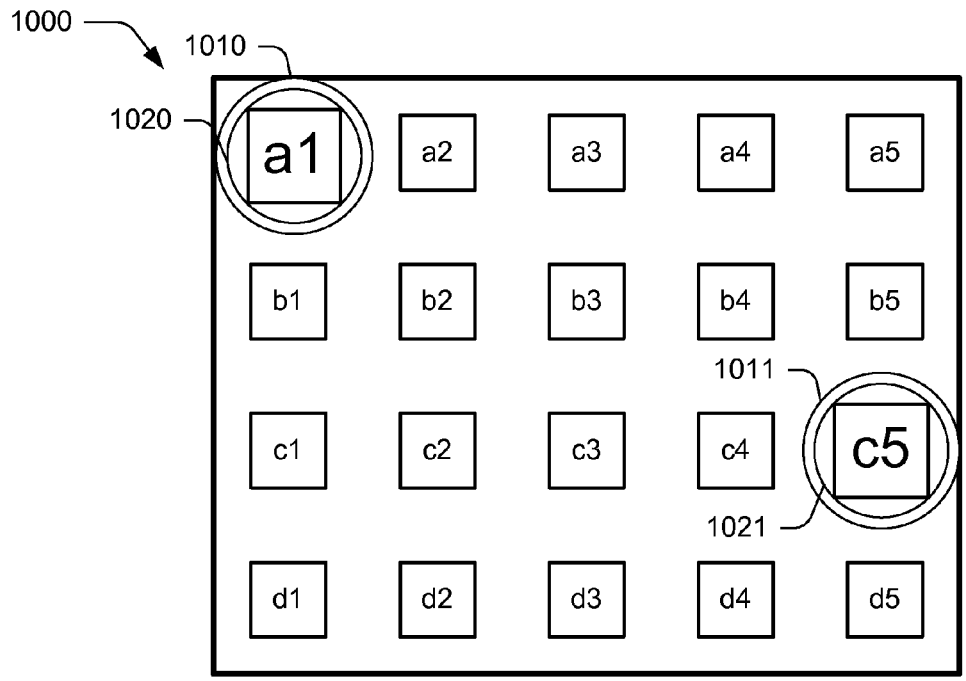
FIG. 10 is a screen capture illustrating a presentation in which first and second lens have been applied to an original image in accordance with an embodiment.
Figure 11:
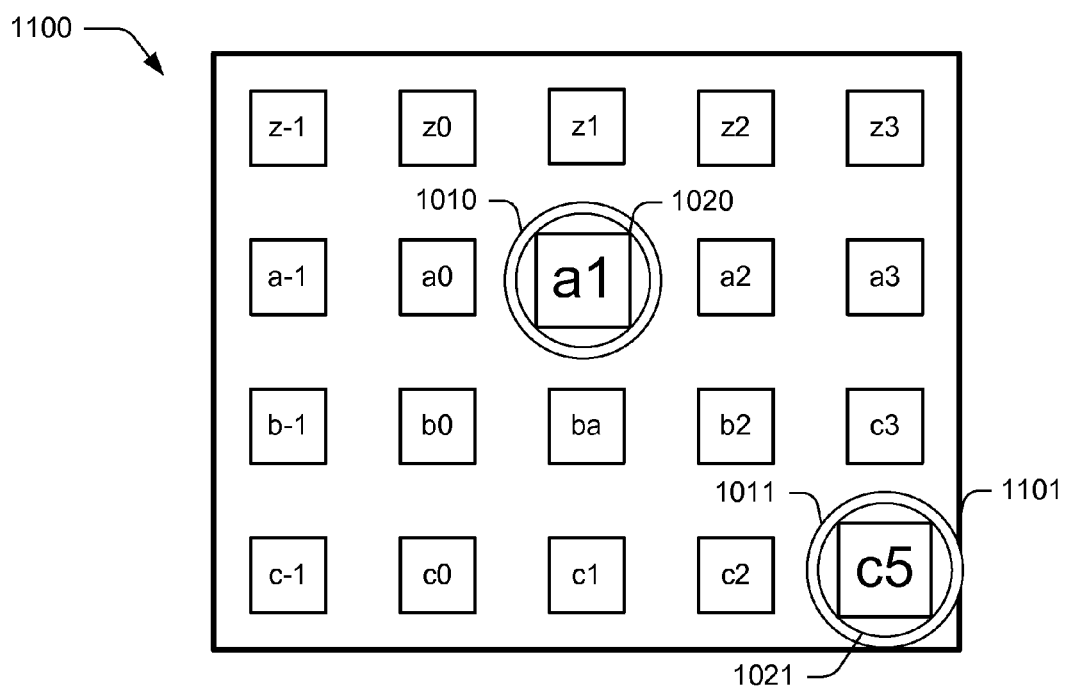
FIG. 11 is a screen capture illustrating a presentation in which lens folding has been applied to provide off-screen awareness of selected objects of interest in FIG. 10 in accordance with an embodiment; and, FIG. 12 is a flow chart illustrating operations of software modules within the memory of a data processing system for generating a presentation of a region-of-interest in an original image for display on a display surface, in accordance with an embodiment.

FIGS. 10 and 11 are screen captures illustrating off-screen awareness via lens folding. FIG. 10 is a screen capture illustrating a presentation 1000 in which first and second lens 1010, 1011 have been applied to an original image in accordance with an embodiment. In FIG. 10, each lens 1010, 1011 has a respective focal region 1020, 1021 which provides detail for respective objects-of-interest (e.g., buildings) in the original image. FIG. 11 is a screen capture illustrating a presentation 1100 in which lens folding has been applied to provide off-screen awareness of selected objects-of-interest in FIG. 10 in accordance with an embodiment. In FIG. 11, the presentation 1000 of FIG. 10 has been panned downward and to the right. This panning would normally have caused the second lens 1011 and the object to which it was applied to move totally off-screen. However, the second lens 1011 has been folded such that its focal region 1121 remains on-screen at the border 1101 of the presentation 1100. Thus, the content of the focal region 1021 of the second lens 1011 remains visible to the user.

Advantageously, with this embodiment, no matter how far a lensed object moves off-screen due to panning, etc., at least a portion of it (e.g., the portion in the focal region 1021) remains visible to the user through folding of the applied lens 1011. The focal region 1021 of the folded lens 1011 may be considered as a geographic bookmark in such a presentation 1100. This provides a variety of additional advantages as follows. Firstly, the object-of-interest is always visible (i.e., in the focal region 1021 of the folded lens 1011). In dynamic data situations, the state of multiple separate objects can be tracked. Second, the direction of the object-of-interest from the current view or presentation is known at all times. That is, the object appears on-screen on the side of the view 1101 that points in the direction of the actual object off-screen.

This method of providing off-screen awareness may be varied. According to one embodiment, off-screen objects that are closer to the border 1101 of the on-screen presentation 1100 than other off-screen objects may have the focal regions 1021 of their folded lenses 1011 emphasized. For example, the focal regions 1021 for closer objects can be made larger while those of further objects can be made smaller, the focal regions 1021 for closer objects can be made less transparent while those of further objects can be made more transparent, etc. Objects can also be emphasized in various other ways in order to draw attention to objects determined to be of greater interest.

According to another embodiment, the object-of-interest (i.e., the focal region 1021 of the folded lens 1011) can function as a tab or bookmark that a user may select to automatically navigate to the object-of-interest off-screen. Thus, navigation between different lensed points can be facilitated by the use of these bookmarks. For example, a user can click on the focal region 1021 of a lens 1011 causing the view to scroll such that the lens 1011 belonging to that focal region 1021 moves to the center of the screen. In effect, scrolling from the presentation 1100 of FIG. 11 back to the presentation 1000 of FIG. 10. Alternately, controls can be attached to lens foci (e.g., via the GUI 400) for allowing users to initiate a similar scroll-to-focus operation.

Figure 12:
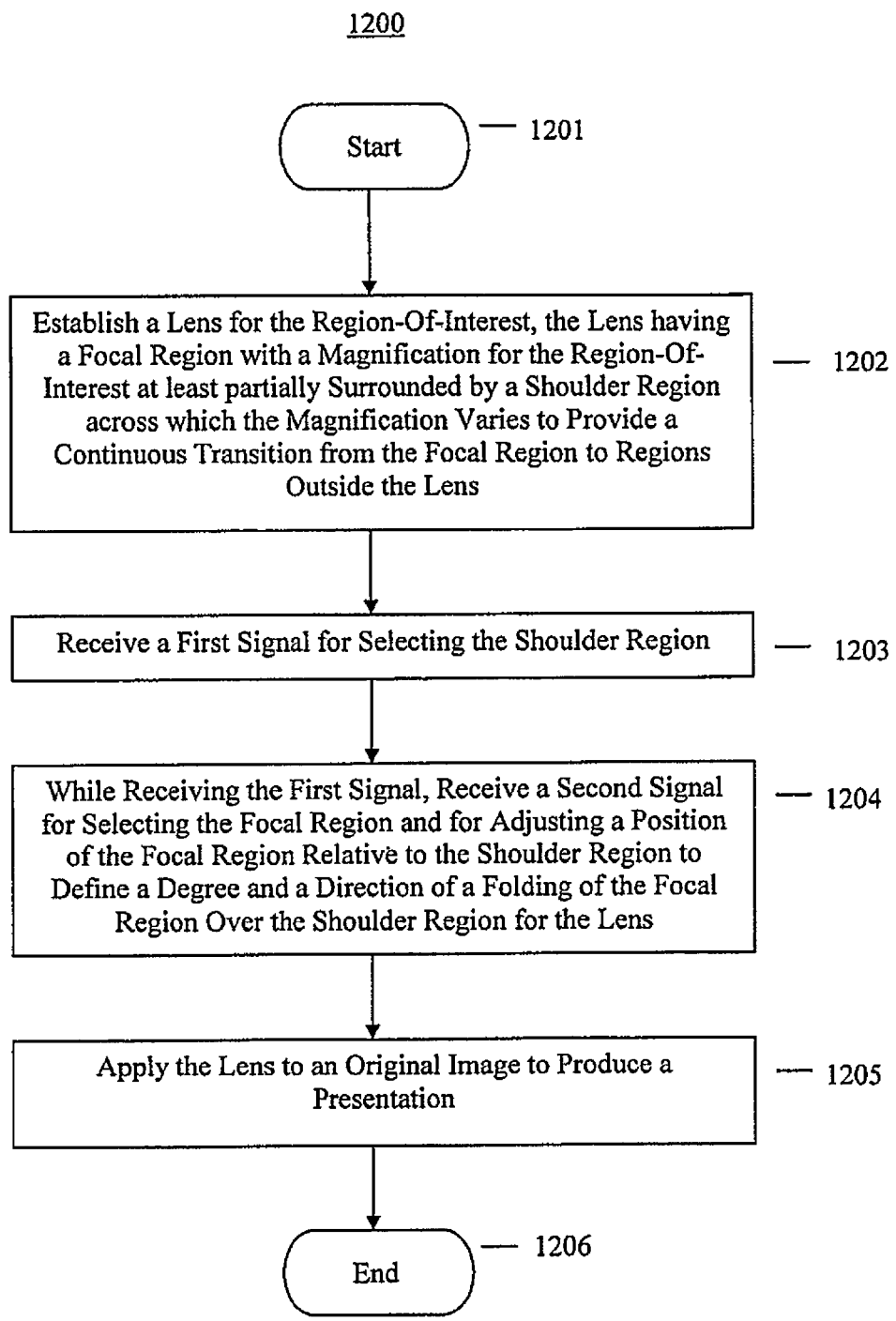

The above described method (i.e., with respect to FIG. 5) may be summarized with the aid of a flowchart. FIG. 12 is a flow chart illustrating operations 1200 of software modules 331 within the memory 330 of a data processing system 300 for generating a presentation 500 of a region-of-interest in an original image for display on a display surface 340, in accordance with an embodiment.

At step 1201, the operations 1200 start.

At step 1202, a lens 410 for the region-of-interest is established, the lens 410 having a focal region 420 with a magnification for the region-of-interest at least partially surrounded by a shoulder region 430 across which the magnification varies to provide a continuous transition from the focal region 420 to regions outside the lens.

At step 1203, a first signal is received for selecting the shoulder region 430.

At step 1204, while receiving the first signal, a second signal is received for selecting the focal region 420 and for adjusting a position of the focal region 420 relative to the shoulder region 430 to define a degree and a direction of a folding of the focal region 420 over the shoulder region 430 for the lens 410.

At step 1205, the lens 410 is applied to the original image to produce the presentation 500.

At step 1206, the operations 1200 end.

The display surface 340 may be a touch sensitive display surface and the method may further include the step of receiving the first and second signals from the touch sensitive display surface touched by a user. The method may further include the step of receiving the first and second signals from a touch sensitive surface input device touched by a user. The first signal may be for selecting the shoulder region 430 and for adjusting a position of the shoulder region 430 relative to the focal region 420 to define the degree and the direction of the folding. The method may further include the step of displaying the presentation 500 on the display surface 340. The lens 410 may be a surface. The focal region 420 may have a size and a shape and the method may further include the step of receiving one or more signals to adjust at least one of the size, shape, and magnification of the focal region 420. The method may further include the step of receiving the one or more signals through a graphical user interface ("GUI") 400 displayed over the lens 410. The GUI 400 may have means for adjusting at least one of the size, shape, and magnification of the focal region 420. At least some of the means may be icons. The means for adjusting the size and shape may be at least one handle icon 481, 481 positioned on the perimeter 421 of the focal region 420. The means for adjusting the magnification may be a slide bar icon 440, 441. The display surface 340 may be a touch sensitive display surface and the method may further include the step of receiving the one or more signals from the touch sensitive display surface touched by a user. The method may further include the step of receiving the one or more signals from a touch sensitive surface input device touched by a user. The shoulder region 430 may have a size and a shape and the method may further include the step of receiving one or more signals through a GUI 400 displayed over the lens 410 to adjust at least one of the size and shape of the shoulder region 430, wherein the GUI 400 has one or more handle icons 491, 492 positioned on the perimeter 411, 412 of the shoulder region 430 for adjusting at least one of the size and the shape of the shoulder region 430. And, the step of applying 1205 may further include the step of displacing the original image onto the lens 410 and perspectively projecting the displacing onto a plane 201 in a direction 231 aligned with a viewpoint 240 for the region-of-interest.

While these techniques are primarily discussed as a method, a person of ordinary skill in the art will understand that the apparatus discussed above with reference to a data processing system 300, may be programmed to enable the practice of the methods. Moreover, an article of manufacture for use with a data processing system 300, such as a pre-recorded storage device or other similar computer readable medium including program instructions recorded thereon, may direct the data processing system 300 to facilitate the practice of the methods. It is understood that such apparatus and articles of manufacture also come within the scope of the techniques described herein.

In particular, the sequences of instructions which when executed cause the method described herein to be performed by the data processing system 300 of FIG. 3 can be contained in a data carrier product according to one embodiment. This data carrier product can be loaded into and run by the data processing system 300 of FIG. 3. In addition, the sequences of instructions which when executed cause the method described herein to be performed by the data processing system 300 of FIG. 3 can be contained in a computer software product according to one embodiment. This computer software product can be loaded into and run by the data processing system 300 of FIG. 3. Moreover, the sequences of instructions which when executed cause the method described herein to be performed by the data processing system 300 of FIG. 3 can be contained in an integrated circuit product including a coprocessor or memory according to one embodiment. This integrated circuit product can be installed in the data processing system 300 of FIG. 3.

The embodiments described above are intended to be examples only. Those skilled in the art will understand that various modifications of detail may be made to these embodiments.

What is claimed is:

1. A method comprising:
   displaying an appearance of a lens in an image on a display surface, the appearance of the lens having a focal region with a magnification, the focal region at least partially within a shoulder region;
   receiving a first signal to select the shoulder region;
   while receiving the first signal, receiving a second signal to select the focal region and to adjust a position of the focal region relative to the shoulder region to define a degree and a direction of a folding of the focal region over the shoulder region for the appearance of the lens; and
   applying the appearance of the lens to the image to produce a presentation having the defined degree and direction of the folding of the focal region over the shoulder region.

2. The method of claim 1 wherein the shoulder region has a magnification that varies to provide a continuous transition from the focal region to an unmagnified region in the image outside the appearance of the lens.

3. The method of claim 1 and further comprising receiving the first and second signals from a touch sensitive surface input device.

4. The method of claim 1 wherein the first signal is for selecting the shoulder region and for adjusting a position of the shoulder region relative to the focal region to define the degree and the direction of the folding.

5. The method of claim 1 and further comprising displaying the presentation on the display surface.

6. The method of claim 1 wherein the focal region has a size and a shape and further comprising receiving one or more signals to adjust the size, the shape, or the magnification of the focal region.

7. The method of claim 6 and further comprising receiving the one or more signals through a graphical user interface ("GUI") displayed over the appearance of the lens.

8. The method of claim 7 wherein the GUI has icons for adjusting at least one of the size, the shape, and the magnification of the focal region.

9. The method of claim 1 wherein the shoulder region has a size and a shape and further comprising receiving one or more signals through a GUI displayed over the appearance of the lens to adjust at least one of the size and shape of the shoulder region, wherein the GUI has one or more icons positioned on a perimeter of the shoulder region for adjusting at least one of the size and the shape of the shoulder region.

10. The method of claim 1 wherein the applying further comprises displacing the image onto the appearance of the lens and perspectively projecting the displacing onto a plane in a direction aligned with a viewpoint for the focal region.

11. A data processing system comprising:
    a processor coupled to memory and a touch sensitive surface input device, the memory including instructions that are executable to cause the data processing system to perform operations comprising:
    establishing an appearance of a lens for an image, the appearance of the lens having a focal region with a magnification at least partially within a shoulder region across which the magnification varies to provide a continuous transition from the focal region to an unmagnified region in the image outside the appearance of the lens; and
    responsive to receiving, via the touch sensitive surface input device, a first signal to select the shoulder region and a second signal to select the focal region and to adjust a position of the focal region relative to the shoulder region to define a degree and a direction of a folding of the focal region over the shoulder region for the appearance of the lens, applying the appearance of the lens to the image to produce a presentation having the defined degree and direction of the folding of the focal region over the shoulder region for the appearance of the lens.

12. The data processing system of claim 11 wherein the touch sensitive surface input device is a display surface that is used to display the image.

13. The data processing system of claim 11 wherein the first signal is for selecting the shoulder region and for adjusting a position of the shoulder region relative to the focal region to define the degree and the direction of the folding.

14. The data processing system of claim 11 wherein the instructions are further executable to cause the data processing system to display the presentation on a display surface.

15. A computer-readable storage device comprising instructions that, responsive to being executed by a data processing system, cause the data processing system to perform operations comprising:
   establishing an appearance of a lens for an image, the appearance of the lens having a focal region with a magnification at least partially within a shoulder region across which the magnification varies to provide a continuous transition from the focal region to an unmagnified region in the image outside the appearance of the lens; and
   responsive to receiving a first signal to select the shoulder region and a second signal to select the focal region and to adjust a position of the focal region relative to the shoulder region to define a degree and a direction of a folding of the focal region over the shoulder region for the appearance of the lens, applying the appearance of the lens to the image to produce a presentation having the defined degree and direction of the folding of the focal region over the shoulder region for the appearance of the lens.

16. The computer-readable storage device of claim 15 wherein the first signal is for selecting the shoulder region and for adjusting a position of the shoulder region relative to the focal region to define the degree and the direction of the folding.

17. The computer-readable storage device of claim 15 wherein the instructions are further executable to cause the data processing system to display the presentation on a display surface.

18. The computer-readable storage device of claim 15 wherein the applying further comprises displacing the image onto the appearance of the lens and perspectively projecting the displacing onto a plane in a direction aligned with a viewpoint for the appearance of the lens.

19. A method implemented by a data processing system comprising:
   establishing an appearance of a lens within an image, the appearance of the lens having a focal region with a magnification at least partially surrounded by a shoulder region across which the magnification varies to provide a continuous transition from the focal region to a region of the image outside the appearance of the lens;
   receiving a first signal for selecting a first point in the focal region and a second signal for selecting a second point in the focal region and for adjusting a position of the second point relative to the first point to define a degree and a direction of a rotation for the appearance of the lens, the selecting of the first and second points performed concurrently; and
   applying the appearance of the lens to the image to produce a presentation.

20. The method of claim 19 and further comprising receiving the first and second signals from a touch sensitive surface input device.

21. The method of claim 19 wherein the first signal is for selecting the first point for adjusting a position of the first point relative to the second point to define the degree and the direction of the rotation.

22. The method of claim 19 and further comprising displaying the presentation on a display surface.

23. A method implemented by a data processing system comprising:
   establishing an appearance of a lens within an image on a display screen for an off-screen object, the appearance of the lens having a focal region with a magnification for the off-screen object at least partially within a shoulder region across which the magnification varies to provide a continuous transition from the focal region to a region of the image outside the appearance of the lens;
   folding the focal region over the shoulder region to position the focal region within a border of the display screen;
   applying the appearance of the lens to the image to produce an on-screen presentation; and
   displaying the on-screen presentation on the display screen.

24. The method of claim 23 wherein the applying further comprises displacing the image onto the appearance of the lens and perspectively projecting the displacing onto a plane in a direction aligned with a viewpoint for the off-screen object.

* * * * *

UNITED STATES PATENT AND TRADEMARK OFFICE
CERTIFICATE OF CORRECTION

PATENT NO. : 8,416,266 B2  
APPLICATION NO. : 12/623765  
DATED : April 9, 2013  
INVENTOR(S) : Shoemaker et al.

Page 1 of 1

It is certified that error appears in the above-identified patent and that said Letters Patent is hereby corrected as shown below:

On the Title page, item (75), under "Inventors", in Column 1, Line 4, delete "West Vancouver" and insert -- North Vancouver --, therefor.

On Title page 4, item (56), under "OTHER PUBLICATIONS", in Column 1, Line 34, delete "techniques.," and insert -- techniques, --, therefor.

On Title page 4, item (56), under "OTHER PUBLICATIONS", in Column 2, Line 34, delete "Visulization" and insert -- Visualization --, therefor.

On Title page 5, item (56), under "OTHER PUBLICATIONS", in Column 1, Line 33, delete "Visualizng" and insert -- Visualizing --, therefor.

On Title page 5, item (56), under "OTHER PUBLICATIONS", in Column 2, Line 5, delete "Symosium." and insert -- Symposium --, therefor.

In the Drawings:

In Fig. 11, Sheet 8 of 9, delete "ba" and insert -- b1 --, therefor.

In the Specifications:

In Column 1, Line 8, delete "(pending)," and insert -- now abandoned, --, therefor.

In Column 13, Line 55, delete "the a" and insert -- the --, therefor.

Signed and Sealed this  
Third Day of September, 2013

Teresa Stanek Rea  
*Acting Director of the United States Patent and Trademark Office*